United States Patent
Chen et al.

(10) Patent No.: US 11,349,719 B2
(45) Date of Patent: May 31, 2022

(54) METHOD AND APPARATUS FOR ADJUSTING BANDWIDTH OF TRANSMISSION CHANNEL IN FLEXIBLE ETHERNET

(71) Applicant: HUAWEI TECHNOLOGIES CO., LTD., Shenzhen (CN)

(72) Inventors: Guodao Chen, Dongguan (CN); Jianhong Qin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/106,160

(22) Filed: Nov. 29, 2020

(65) Prior Publication Data

US 2021/0083943 A1  Mar. 18, 2021

Related U.S. Application Data

(63) Continuation of application No. PCT/CN2019/089173, filed on May 30, 2019.

(30) Foreign Application Priority Data

May 31, 2018  (CN) .......................... 201810552046.2

(51) Int. Cl.
*H04L 41/0896*  (2022.01)
*H04L 5/00*  (2006.01)
(Continued)

(52) U.S. Cl.
CPC ........ *H04L 41/0896* (2013.01); *H04L 5/0053* (2013.01); *H04L 47/76* (2013.01); *H04L 47/80* (2013.01)

(58) Field of Classification Search
CPC ... H04L 41/0896; H04L 5/0053; H04L 47/76; H04L 47/80
See application file for complete search history.

(56) References Cited

U.S. PATENT DOCUMENTS

| | | | |
|---|---|---|---|
| 8,681,632 B2 | 3/2014 | Bencheck et al. | |
| 9,848,049 B2 | 12/2017 | Moynihan et al. | |
| 2018/0013511 A1* | 1/2018 | Hussain | H04J 14/0204 |

FOREIGN PATENT DOCUMENTS

| | | |
|---|---|---|
| CN | 101072073 A | 11/2007 |
| CN | 101119307 A | 2/2008 |

(Continued)

OTHER PUBLICATIONS

Office Action issued in Application No. IN202017052408, dated Dec. 30, 2021, 7 pages.

(Continued)

*Primary Examiner* — Duc C Ho

(57) ABSTRACT

This application discloses a method and an apparatus for adjusting a bandwidth of a transmission channel in flexible Ethernet. When the bandwidth of the transmission channel needs to be increased, bandwidths of all nodes are successively increased based on a direction reverse to a flow direction of service data, and when the bandwidth of the transmission channel needs to be decreased, bandwidths of all nodes are successively decreased based on the flow direction of the service data. In this way, a probability of a loss of service data transmitted from upstream to downstream is reduced in a process of adjusting the bandwidth of the transmission channel, and this improves reliability of service data transmission.

20 Claims, 9 Drawing Sheets

(51) Int. Cl.
*H04L 47/76* (2022.01)
*H04L 47/80* (2022.01)

(56) References Cited

FOREIGN PATENT DOCUMENTS

| | | | |
|---|---|---|---|
| CN | 101150878 A | 3/2008 | |
| CN | 101163148 A | 4/2008 | |
| CN | 102571544 A | 7/2012 | |
| CN | 104270258 A | 1/2015 | |
| CN | 106803814 A | 6/2017 | |
| CN | 107612825 A | 1/2018 | |
| CN | 107786351 A | 3/2018 | |
| CN | 108777667 A | 11/2018 | |
| JP | 2018046373 A | 3/2018 | |
| WO | 2004032434 A1 | 4/2004 | |
| WO | 2017012510 A1 | 1/2017 | |
| WO | 2017070851 A1 | 5/2017 | |
| WO | WO-2018103740 A1 * | 6/2018 | ............ H04J 3/0608 |
| WO | WO-2018113329 A1 * | 6/2018 | ................ H04J 3/07 |

OTHER PUBLICATIONS

Office Action issued in CN 201810552046.2 dated Feb. 3, 2021, total 6 pages.
Stephen J. Trowbridge et al,"Flex Ethernet Implementation Agreement 1.1", IA#OIF-FLEXE-01.1, Jun. 21, 2017, total 35 pages.
Office Action issued in JP2020-566261, dated Feb. 22, 2022, 5 pages.

* cited by examiner

METHOD AND APPARATUS FOR ADJUSTING BANDWIDTH OF TRANSMISSION CHANNEL IN FLEXIBLE ETHERNET

CROSS-REFERENCE TO RELATED APPLICATIONS

This application is a continuation of International Application No. PCT/CN2019/089173, filed on May 30, 2019, which claims priority to Chinese Patent Application No. 201810552046.2, filed on May 31, 2018. The disclosures of the aforementioned applications are hereby incorporated by reference in their entireties.

TECHNICAL FIELD

The present invention relates to the communications field, and in particular, to a method and an apparatus for adjusting a bandwidth of a transmission channel in flexible Ethernet.

BACKGROUND

With development of network technologies, an existing communications system (for example, a 5G network) has an increasingly high requirement on a network bandwidth, and in addition, service diversity imposes an increasingly high requirement on performance of a network slice. To reduce network construction costs, a telecommunications operator proposes a requirement of integrated bearing.

An existing service data transmission method mainly includes a time division multiplexing (TDM) technology in a telecommunications network and statistical multiplexing in the internet. Main advantages of the TDM are hard pipes and low jitter, and a main advantage of the statistical multiplexing is bandwidth saving. To integrate the advantages of the TDM and the statistical multiplexing, it is proposed to use flexible Ethernet as a bearer network of the 5G network. The FlexE is an Ethernet-based enhanced network on which the TDM technology is added. In a FlexE network, a FlexE interface is used as a network-side interface. In addition to an L2 (link layer) cross-connection and an L3 (network layer) cross-connection that are supported by an IP network, an L1 (physical layer) cross-connection technology is further added, namely, a FlexE cross-connection function. In an actual application scenario, a channel bandwidth in the FlexE network needs to be adjusted, to better meet a requirement of a service type. An existing method for adjusting a channel bandwidth is as follows: A network management system (NMS) delivers a new slot configuration to each network node (NE), to trigger independent adjustment of a bandwidth between two adjacent NEs. A problem of this bandwidth adjustment method is as follows: Because a plurality of nodes in the FlexE network complete bandwidth adjustment in sequence, in a bandwidth adjustment process, a bandwidth of an upstream node may be greater than a bandwidth of a downstream node. In this case, when service data of the upstream node is sent to the downstream node, data discarding occurs, and a service is affected.

SUMMARY

A technical problem to be resolved in this application is to provide a method and an apparatus for adjusting a bandwidth of a transmission channel in flexible Ethernet. In a process of adjusting the bandwidth of the transmission channel in the flexible Ethernet, a probability of a loss of service data transmitted from upstream to downstream can be reduced, and reliability of service data transmission can be improved.

To resolve the foregoing technical problem, this application provides a method for adjusting a bandwidth of a transmission channel in flexible Ethernet. There are an upstream node, an intermediate node, and a downstream node on a path of the transmission channel. The intermediate node is located between the upstream node and the downstream node, and the intermediate node is adjacent to the upstream node and the downstream node. The upstream node includes a first FlexE interface, the intermediate node includes a second FlexE interface and a third FlexE interface, the downstream node includes a fourth FlexE interface. The upstream node is connected to the intermediate node through the first FlexE interface and the second FlexE interface, and the intermediate node is connected to the downstream node through the third FlexE interface and the fourth FlexE interface. The first FlexE interface includes a first transmit port and a first receive port, the second FlexE interface includes a second transmit port and a second receive port, the third FlexE interface includes a third transmit port and a third receive port, and the fourth FlexE interface includes a fourth transmit port and a fourth receive port. The first transmit port is bound to a first primary sending slot table and a first secondary sending slot table, the second receive port is bound to a first primary receiving slot table and a first secondary receiving slot table, the third transmit port is bound to a second primary sending slot table and a second secondary sending slot table, and the fourth receive port is bound to a second primary receiving slot table and a second secondary receiving slot table.

A flow direction of service data on the transmission channel is: the upstream node→the intermediate node→the downstream node, and a location of each node on the transmission channel is determined based on the flow direction of the service data. For example, for a node 1, a node 2, and a node 3, if a flow direction of service data is: the node 1→the node 2→the node 3, the node 1 is an upstream node, the node 2 is an intermediate node, and the node 3 is a downstream node. If a flow direction of service data is opposite to the foregoing direction, to be specific, the flow direction of the service data is: the node 3→the node 2→the node 1, the node 3 is an upstream node, the node 2 is an intermediate node, and the node 1 is a downstream node.

In this application, to increase the bandwidth of the transmission channel, a bandwidth indicated by the first secondary sending slot table is greater than a bandwidth indicated by the first primary sending slot table, a bandwidth indicated by the first secondary receiving slot table is greater than a bandwidth indicated by the first primary receiving slot table, a bandwidth indicated by the second secondary sending slot table is greater than a bandwidth indicated by the second primary sending slot table, and a bandwidth indicated by the second secondary receiving slot table is greater than a bandwidth indicated by the second primary receiving slot table.

The method in this application includes:

receiving, by the intermediate node, first indication information from the downstream node, where the first indication information is used to instruct the intermediate node to increase the bandwidth of the transmission channel;

sending, by the intermediate node, second indication information to the downstream node, where the second indication information is used to instruct the downstream node to switch from the currently used second primary receiving slot table to the second secondary receiving slot table;

after sending the second indication information, switching, by the intermediate node, from the currently used second primary sending slot table to the second secondary sending slot table;

after switching to the second secondary sending slot table, sending, by the intermediate node, third indication information to the upstream node, where the third indication information is used to instruct the upstream node to increase the bandwidth of the transmission channel;

receiving, by the intermediate node, fourth indication information from the upstream node, where the fourth indication information is used to instruct the intermediate node to switch from the currently used first primary receiving slot table to the first secondary receiving slot table; and switching, by the intermediate node, from the first primary receiving slot table to the first secondary receiving slot table according to the fourth indication information.

During implementation of this embodiment of this application, when the bandwidth of the channel needs to be increased, bandwidths of the nodes are successively increased based on a direction reverse to the flow direction of the service data, to ensure that a bandwidth of the downstream node is not less than a bandwidth of the upstream node, avoid a loss caused by insufficient bandwidths in a process of sending the service data of the upstream node to the downstream node, and improve reliability of service data transmission.

In a possible design, after the receiving, by the intermediate node, first indication information from the downstream node, the method further includes:

sending, by the intermediate node, fifth indication information and the second secondary sending slot table to the downstream node, where the fifth indication information is used to request the downstream node to switch from the currently used second primary receiving slot table to the second secondary receiving slot table, and the second secondary sending slot table and the fifth indication information may be carried in a same FlexE overhead, or may be carried in different FlexE overheads; and receiving, by the intermediate node, sixth indication information from the downstream node, where the sixth indication information is used to indicate that the downstream node allows switching from the currently used second primary receiving slot table to the second secondary receiving slot table.

In this embodiment, the intermediate node and the downstream node confirm, through requesting and responding, that the downstream node allows switching from the currently used second primary receiving slot table to the second secondary receiving slot table, so as to avoid switching performed by the downstream node without preparation, thereby improving a switching success rate.

In a possible design, after the sending, by the intermediate node, third indication information to the upstream node, the method further includes:

synchronizing, by the intermediate node, the first secondary receiving slot table based on the first secondary sending slot table, so that a receiving slot of the first secondary receiving slot table is consistent with a slot of the first secondary sending slot table. A purpose of synchronizing is to ensure that a receive port and a transmit port transmit and receive service data on a same slot. This prevents a transmission failure caused by different slots after a primary slot table is replaced with a secondary slot table.

In a possible design, before the synchronizing, by the intermediate node, the first secondary receiving slot table based on the first secondary sending slot table, the method further includes:

receiving, by the intermediate node, seventh indication information and the first secondary sending slot table from the upstream node, where the seventh indication information is used to request the intermediate node to switch from the currently used first primary receiving slot table to the first secondary receiving slot table. The first secondary receiving slot table and the seventh indication information may be carried in a same FlexE overhead, or may be carried in different FlexE overheads.

In a possible design, after the synchronizing, by the intermediate node, the first secondary receiving slot table based on the first secondary sending slot table, the method further includes:

sending, by the intermediate node, eighth indication information to the upstream node, where the eighth indication information is used to indicate that the intermediate node allows switching from the currently used first primary receiving slot table to the first secondary receiving slot table.

In this embodiment of the present invention, before switching the slot table, the intermediate node notifies, by using indication information, the upstream node that it is allowed to switch from the currently used first primary receiving slot table to the first secondary receiving slot table, so as to avoid switching performed by the intermediate node without preparation, thereby improving a switching success rate.

In a possible design, before the synchronizing, by the intermediate node, the first secondary receiving slot table based on the first secondary sending slot table, the method further includes:

determining, by the intermediate node, that a slot indicated by the first secondary sending slot table is in an available state.

In a possible design, the first indication information and the third indication information each are carried in a FlexE overhead.

In a possible design, control information between adjacent nodes is transmitted by using a FlexE overhead, the FlexE overhead is a block, and the block periodically appears. The control information is used to control node-related behaviors, such as requesting, responding, slot table switching, and slot table synchronizing.

In a possible design, the first indication information includes one or more bits, a first value of the one or more bits corresponds to the second primary receiving slot table, and a second value of the one or more bits corresponds to the second secondary receiving slot table; and the third indication information includes one or more bits, a first value of the one or more bits corresponds to the first primary receiving slot table, and a second value of the one or more bits corresponds to the first secondary receiving slot table.

In a possible design, a FlexE overhead used to carry the first indication information further includes an identifier of the transmission channel, or a FlexE overhead used to carry the third indication information further includes an identifier of the transmission channel.

In a possible design, before the receiving, by the intermediate node, first indication information from the downstream node, the method further includes:

before the receiving, by the intermediate node, first indication information from the downstream node, the method further includes:

receiving, by the intermediate node, sending slot configuration information from a network management system; and obtaining, by the intermediate node, the second secondary sending slot table through configuration based on the sending slot configuration information, where the bandwidth indicated by the configured second secondary sending slot table is greater than the bandwidth indicated by the second primary sending slot table currently used by the intermediate node.

According to a second aspect, this application discloses a method for adjusting a bandwidth of a transmission channel in flexible Ethernet. There are a source node and a downstream node on a path of the transmission channel, a flow direction of service data on the transmission channel is from the source node to the downstream node, and the source node is adjacent to the downstream node. The source node includes a first FlexE interface, the downstream node includes a second FlexE interface, and the source node is connected to the downstream node through the first FlexE interface and the second FlexE interface. The first FlexE interface includes a first transmit port and a first receive port, the second FlexE interface includes a second transmit port and a second receive port, the first transmit port is bound to a first primary sending slot table and a first secondary sending slot table, and the second receive port is bound to a first primary receiving slot table and a first secondary receiving slot table.

The method includes: sending, by the source node, a slot change request and the first secondary sending slot table to the downstream node, where the slot change request is used to request the downstream node to switch from the currently used first primary receiving slot table to the first secondary receiving slot table; receiving, by the source node from the downstream node, a slot change acknowledgment generated based on the slot change request, where the slot change acknowledgment is used to indicate that the downstream node has prepared to switch from the currently used first primary receiving slot table to the first secondary receiving slot table; sending, by the source node, a calendar switching instruction to the downstream node, where the calendar switching instruction is used to instruct the downstream node to switch from the currently used first primary receiving slot table to the first secondary receiving slot table; and after sending the calendar switching instruction, switching, by the source node, from the currently used first primary sending slot table to the first secondary sending slot table. In this way, the source node sends service data to the downstream node on a slot indicated by the first secondary sending slot table, and the downstream node receives the service data from the source node on a slot indicated by the first secondary receiving slot table.

In a possible design, after the switching, by the source node, from the currently used first primary sending slot table to the first secondary sending slot table, the method further includes:

sending, by the source node, a bandwidth increase success message to a network management system, where the bandwidth increase success message is used to indicate that the bandwidth of the transmission channel is successfully increased.

In a possible design, before the sending, by the source node, the first secondary sending slot table and a slot change request to the downstream node, the method further includes:

receiving, by the source node, a bandwidth increase instruction from the downstream node, where the bandwidth increase instruction is used to instruct to increase the bandwidth of the transmission channel.

In a possible design, after the switching, by the source node, from the currently used first primary sending slot table to the first secondary sending slot table, the method further includes:

sending, by the source node, a bandwidth decrease instruction to the downstream node, where the bandwidth decrease instruction is used to instruct to decrease the bandwidth of the transmission channel.

In a possible design, before the sending, by the source node, the first secondary receiving slot table and a slot change request to the downstream node, the method further includes:

receiving, by the source node, a bandwidth decrease adjustment instruction from the network management system, where the bandwidth decrease adjustment instruction is used to instruct to adjust the bandwidth of the transmission channel starting from the source node.

In a possible design, the method further includes:

receiving, by the source node, sending slot configuration information from the network management system, where the sending slot configuration information is used to configure the first secondary sending slot table.

In a possible design, the calendar switching instruction corresponds to a first value of a slot table status flag in an overhead block, and the slot table status flag is one or more bits.

According to a third aspect, this application provides a method for adjusting a bandwidth of a transmission channel in flexible Ethernet. There are an upstream node and a destination node on a path of the transmission channel, a flow direction of service data on the transmission channel is from the upstream node to the destination node, and the upstream node is adjacent to the destination node. The upstream node includes a first FlexE interface, the destination node includes a second FlexE interface, and the upstream node is connected to the destination node through the first FlexE interface and the second FlexE interface. The first FlexE interface includes a first transmit port and a first receive port, the second FlexE interface includes a second transmit port and a second receive port, the first transmit port is bound to a first primary sending slot table and a first secondary sending slot table, and the second receive port is bound to a first primary receiving slot table and a first secondary receiving slot table.

The method of this application includes: receiving, by the destination node, the first secondary sending slot table and a slot change request from the upstream node, where the slot change request is used to request the destination node to prepare to switch from the currently used first primary receiving slot table to the first secondary receiving slot table;

synchronizing, by the destination node, the first secondary receiving slot table based on the first secondary sending slot table, so that a slot indicated by the first secondary receiving slot table is consistent with a slot indicated by the first secondary sending slot table;

sending, by the destination node, a slot change acknowledgment to the upstream node, where the slot change acknowledgment indicates that the destination node has prepared to switch from the currently used first primary receiving slot table to the first secondary receiving slot table;

receiving, by the destination node, a calendar switching instruction from the upstream node, where the calendar switching instruction is used to instruct the destination node to switch from the first primary receiving slot table to the first secondary receiving slot table; and switching, by the destination node, from the first primary receiving slot table to the first secondary receiving slot table according to the calendar switching instruction. In this way, the upstream node sends service data to the destination node on a slot indicated by the first secondary sending slot table, and the destination node receives the service data from the upstream node on a slot indicated by the first secondary receiving slot table.

In a possible design, before the receiving, by the destination node, the first secondary sending slot table and a slot change request from the upstream node, the method further includes:

sending, by the destination node, a bandwidth increase instruction to the upstream node, where the bandwidth increase instruction is used to instruct to increase the bandwidth of the transmission channel.

In a possible design, before the sending, by the destination node, a bandwidth increase instruction to the upstream node, the method further includes:

receiving, by the destination node, a bandwidth increase adjustment instruction from a network management system, where the bandwidth increase adjustment instruction is used to instruct to adjust the bandwidth of the transmission channel starting from the destination node.

In a possible design, after the receiving, by the destination node, a calendar switching instruction from the upstream node, the method further includes:

receiving, by the destination node, a bandwidth decrease instruction from the upstream node, where the bandwidth decrease instruction is used to instruct to decrease the bandwidth of the transmission channel.

In a possible design, after the receiving, by the destination node, a bandwidth decrease instruction from the upstream node, the method further includes:

sending, by the destination node, a bandwidth decrease success message to the network management system, where the bandwidth decrease success message is used to indicate that the bandwidth of the transmission channel is successfully decreased.

According to a fourth aspect, this application discloses a method for adjusting a bandwidth of a transmission channel in flexible Ethernet. There are an upstream node, an intermediate node, and an upstream node on the transmission channel, a flow direction of service data on the transmission channel is: the upstream node→the intermediate node→the downstream node, the intermediate node is located between the upstream node and the downstream node, and the intermediate node is adjacent to the upstream node and the downstream node. The upstream node includes a first FlexE interface, the intermediate node includes a second FlexE interface and a third FlexE interface, and the downstream node includes a fourth FlexE interface. The upstream node is connected to the intermediate node through the first FlexE interface and the second FlexE interface, and the intermediate node is connected to the downstream node through the third FlexE interface and the fourth FlexE interface. The first FlexE interface includes a first transmit port and a first receive port, the second FlexE interface includes a second transmit port and a second receive port, the third FlexE interface includes a third transmit port and a third receive port, and the fourth FlexE interface includes a fourth transmit port and a fourth receive port. The first transmit port is bound to a first primary sending slot table and a first secondary sending slot table, the second receive port is bound to a first primary receiving slot table and a first secondary receiving slot table, the third transmit port is bound to a second primary sending slot table and a second secondary sending slot table, and the fourth receive port is bound to a second primary receiving slot table and a second secondary receiving slot table.

A bandwidth indicated by the first secondary sending slot table is less than a bandwidth indicated by the first primary sending slot table, a bandwidth indicated by the first secondary receiving slot table is less than a bandwidth indicated by the first primary receiving slot table, a bandwidth indicated by the second secondary sending slot table is less than a bandwidth indicated by the second primary sending slot table, and a bandwidth indicated by the second secondary receiving slot table is less than a bandwidth indicated by the second primary receiving slot table.

The method in this application includes:

receiving, by the intermediate node, first indication information from the upstream node, where the first indication information is used to instruct the intermediate node to switch from the currently used first primary receiving slot table to the first secondary receiving slot table;

switching, by the intermediate node, from the first primary receiving slot table to the first secondary receiving slot table according to the first indication information;

sending, by the intermediate node, third indication information to the downstream node, where the third indication information is used to instruct the downstream node to switch from the currently used second primary receiving slot table to the second secondary receiving slot table; and after sending the third indication information, switching, by the intermediate node, from the currently used second primary sending slot table to the second secondary sending slot table.

During implementation of this application, when the bandwidth of the transmission channel needs to be decreased, bandwidths of the nodes are successively decreased based on a flow direction of the service data, to ensure that a bandwidth of the downstream node is not less than a bandwidth of the upstream node, avoid a loss caused by insufficient bandwidths in a process of sending the service data of the upstream node to the downstream node, and improve reliability of service data transmission.

In a possible design, after the switching, by the intermediate node, from the first primary receiving slot table to the first secondary receiving slot table according to the first indication information, the method further includes:

receiving, by the intermediate node, second indication information from the upstream node, where the second indication information is used to instruct the intermediate node to decrease the bandwidth of the transmission channel; and after the switching, by the intermediate node, from the second primary sending slot table to the second secondary sending slot table, the method further includes:

sending, by the intermediate node, fourth indication information to the downstream node, where the fourth indication information is used to instruct the downstream node to decrease the bandwidth of the transmission channel.

In a possible design, before the receiving, by the intermediate node, first indication information from the upstream node, the method further includes:

synchronizing, by the intermediate node, the first secondary receiving slot table based on the first secondary sending slot table, so that a slot indicated by the first secondary receiving slot table is consistent with a slot indicated by the first secondary sending slot table.

In a possible design, before the synchronizing, by the intermediate node, the first secondary receiving slot table based on the first secondary sending slot table, the method further includes:

receiving, by the intermediate node, the first secondary sending slot table and fifth indication information from the upstream node, where the fifth indication information is used to request the intermediate node to switch from the currently used first primary receiving slot table to the first secondary receiving slot table. The first secondary sending slot table and the fifth indication information may be carried in a same FlexE overhead, or may be carried in different FlexE overheads.

In a possible design, after the synchronizing, by the intermediate node, the first secondary receiving slot table based on the first secondary sending slot table, the method further includes:

sending, by the intermediate node, sixth indication information to the upstream node, where the sixth indication information is used to indicate that the intermediate node allows switching from the currently used first primary receiving slot table to the first secondary receiving slot table.

In a possible design, before the sending, by the intermediate node, third indication information to the downstream node, the method further includes:

sending, by the intermediate node, seventh indication information and the second secondary sending slot table to the downstream node, where the seventh indication information is used to request the downstream node to switch from the currently used second primary receiving slot table to the second secondary receiving slot table; and receiving, by the intermediate node, eighth indication information from the downstream node, where the eighth indication information is used to indicate that the downstream node allows switching from the currently used second primary receiving slot table to the second secondary receiving slot table.

In a possible design, the first indication information and the third indication information each are carried in a FlexE overhead.

In a possible design, a FlexE overhead used to carry the first indication information further include an identifier of the transmission channel, or a FlexE overhead used to carry the third indication information further includes an identifier of the transmission channel.

In a possible design, before the synchronizing, by the intermediate node, the first secondary receiving slot table based on the first secondary sending slot table, the method further includes:

receiving, by the intermediate node, sending slot configuration information from a network management system; and obtaining, by the intermediate node, the second secondary sending slot table through configuration based on the sending slot configuration information, where the bandwidth indicated by the configured second secondary sending slot table is less than the bandwidth indicated by the second primary sending slot table currently used by the intermediate node.

According to a fifth aspect, this application provides a method for increasing a bandwidth of a transmission channel in flexible Ethernet. There are an upstream node, an intermediate node, and an upstream node on the transmission channel, a flow direction of service data on the transmission channel is: the upstream node→the intermediate node→the downstream node, the intermediate node is located between the upstream node and the downstream node, and the intermediate node is adjacent to the upstream node and the downstream node. The upstream node includes a first FlexE interface, the intermediate node includes a second FlexE interface and a third FlexE interface, and the downstream node includes a fourth FlexE interface. The upstream node is connected to the intermediate node through the first FlexE interface and the second FlexE interface, and the intermediate node is connected to the downstream node through the third FlexE interface and the fourth FlexE interface. The first FlexE interface includes a first transmit port and a first receive port, the second FlexE interface includes a second transmit port and a second receive port, the third FlexE interface includes a third transmit port and a third receive port, and the fourth FlexE interface includes a fourth transmit port and a fourth receive port. The first transmit port is bound to a first primary sending slot table and a first secondary sending slot table, the second receive port is bound to a first primary receiving slot table and a first secondary receiving slot table, the third transmit port is bound to a second primary sending slot table and a second secondary sending slot table, and the fourth receive port is bound to a second primary receiving slot table and a second secondary receiving slot table.

In this application, to increase the bandwidth of the transmission channel, a bandwidth indicated by the first primary sending slot table is less than a bandwidth indicated by the first secondary sending slot table, a bandwidth indicated by the first primary receiving slot table is less than a bandwidth indicated by the first secondary receiving slot table, a bandwidth indicated by the second primary sending slot table is less than a bandwidth indicated by the second secondary sending slot table, and a bandwidth indicated by the second primary receiving slot table is less than a bandwidth indicated by the second secondary receiving slot table.

The method in this application includes:

sending, by the intermediate node, first indication information to the downstream node, where the first indication information is used to instruct the downstream node to switch from the currently used second primary receiving slot table to the second secondary receiving slot table;

after sending the first indication information, switching, by the intermediate node, from the currently used second primary sending slot table to the second secondary sending slot table;

receiving, by the intermediate node, second indication information from the upstream node, where the second indication information is used to instruct the intermediate node to switch from the currently used first primary receiving slot table to the first secondary receiving slot table; and switching, by the intermediate node, from the first primary receiving slot table to the first secondary receiving slot table according to the second indication information.

During implementation of this embodiment of this application, when the bandwidth of the channel needs to be increased, bandwidths of the nodes are successively increased based on a direction reverse to the flow direction of the service data, to ensure that a bandwidth of the downstream node is not less than a bandwidth of the upstream node, avoid a loss caused by insufficient bandwidths in a process of sending the service data of the upstream node to the downstream node, and improve reliability of service data transmission.

In a possible design, before the sending, by the intermediate node, first indication information to the downstream node, the method further includes:

synchronizing, by the intermediate node, the first secondary receiving slot table based on the first secondary sending slot table, so that a slot indicated by the first secondary receiving slot table is consistent with a slot indicated by the first secondary sending slot table.

In a possible design, before the synchronizing, by the intermediate node, the first secondary receiving slot table based on the first secondary sending slot table, the method further includes:

receiving, by the intermediate node, third indication information and the first secondary sending slot table from the upstream node, where the third indication information is used to request the intermediate node to switch from the currently used first primary receiving slot table to the first secondary receiving slot table; and sending, by the intermediate node, fourth indication information to the upstream node, where the fourth indication information is used to indicate that the intermediate node allows switching from the currently used first primary receiving slot table to the first secondary receiving slot table.

In a possible design, after the synchronizing, by the intermediate node, the first secondary receiving slot table based on the first secondary sending slot table, the method further includes:

sending, by the intermediate node, fifth indication information and the second secondary sending slot table to the downstream node, where the fifth indication information is used to request the downstream node to switch from the currently used second primary receiving slot table to the second secondary receiving slot table; and receiving, by the intermediate node, sixth indication information from the downstream node, where the sixth indication information is used to indicate that the downstream node allows switching from the currently used second primary receiving slot table to the second secondary receiving slot table.

In a possible design, before the synchronizing, by the intermediate node, the first secondary receiving slot table based on the first secondary sending slot table, the method further includes:

receiving, by the intermediate node, sending slot configuration information from a network management system; and obtaining, by the intermediate node, the second secondary sending slot table through configuration based on the sending slot configuration information, where the bandwidth indicated by the configured second secondary sending slot table is less than the bandwidth indicated by the second primary sending slot table currently used by the intermediate node.

Another aspect of this application provides a computer-readable storage medium, and the computer-readable storage medium includes a program designed for executing the foregoing aspects.

Another aspect of this application provides an apparatus, the apparatus includes a transceiver, a memory, and a processor, the transceiver is configured to receive data and send data, and the transceiver may include a transmitter and a receiver. The memory stores a group of program code, and the processor is configured to invoke the program code stored in the memory, to perform the possible implementations in the foregoing aspects.

Another aspect of this application provides a computer program product, the computer program includes an instruction, and when the computer program is executed by a computer, the computer is enabled to perform the procedure in the method according to the first aspect or the fifth aspect.

BRIEF DESCRIPTION OF DRAWINGS

FIG. 2 is a schematic interaction diagram of adjusting a bandwidth of a transmission channel in flexible Ethernet according to an embodiment of the present invention;

FIG. 3 is another schematic interaction diagram of adjusting a bandwidth of a transmission channel in flexible Ethernet according to an embodiment of the present invention;

DESCRIPTION OF EMBODIMENTS

Figure 1A:
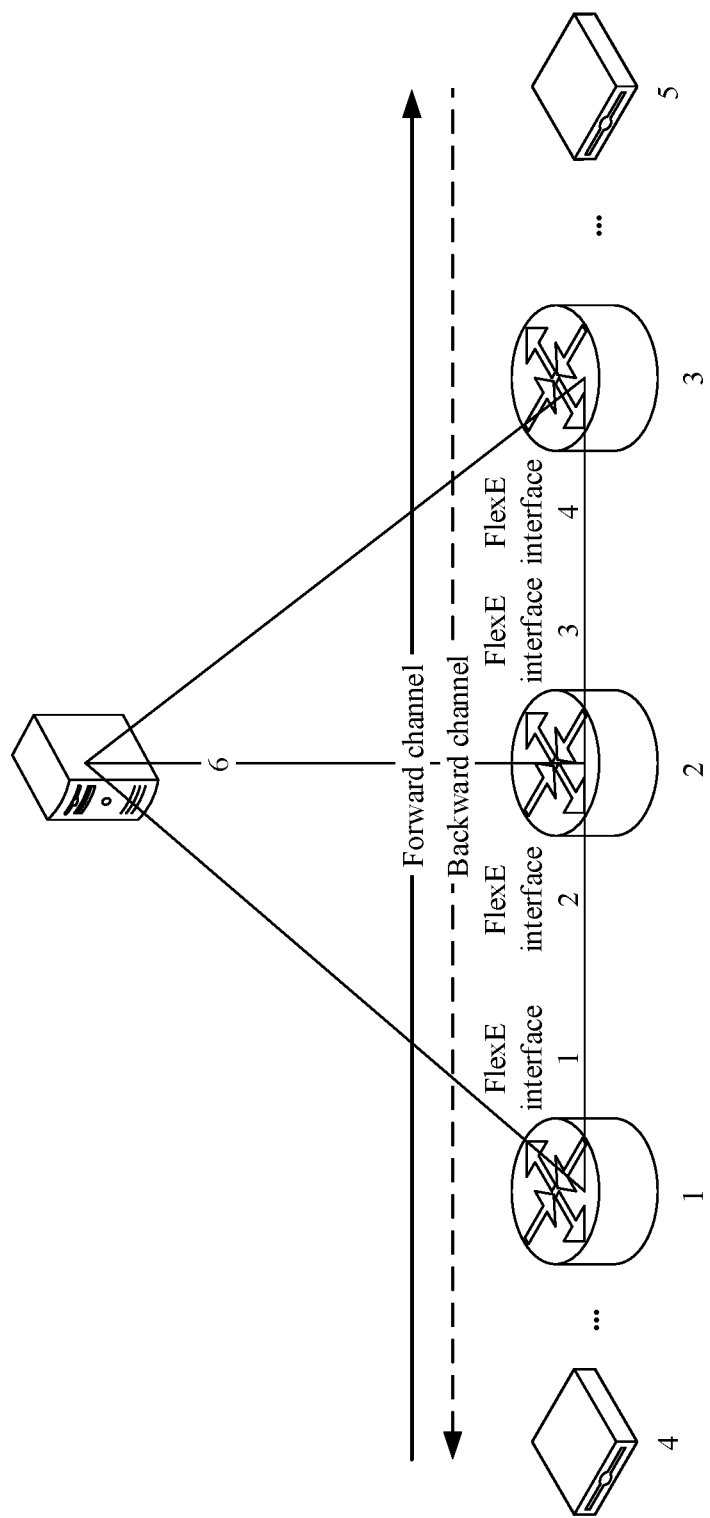
FIG. 1a is a schematic structural diagram of a FlexE communications system according to an embodiment of the present invention.
Figures 1, 1B:
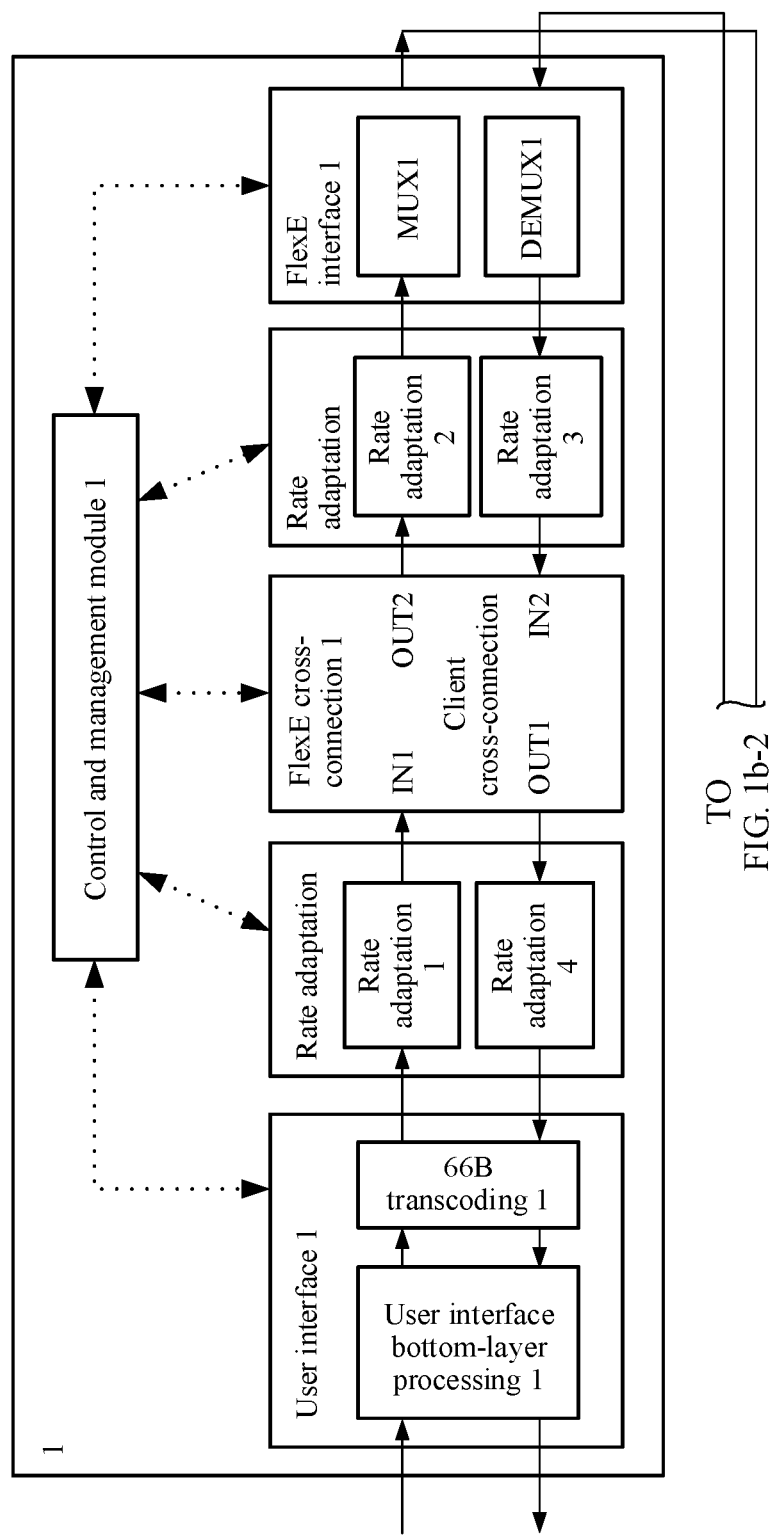
FIG. 1b-1 to FIG. 1b-3 are a schematic structural diagram of an intermediate node according to an embodiment of the present invention.

The following describes the technical solutions in the embodiments of the present invention with reference to the accompanying drawings in the embodiments of the present invention.

A FlexE communications system provided in the embodiments of the present invention includes a network management system (NMS), an upstream node, an intermediate node, a downstream node, and at least two user equipments. The upstream node is adjacent to the intermediate node, and the intermediate node is adjacent to the downstream node. When the upstream node is connected to user equipment by using another network node, the upstream node is an intermediate node. When the upstream node is directly connected to the user equipment, the upstream node is an edge node. When the downstream node is connected to user equipment by using another network node, the downstream node is an intermediate node. When the downstream node is directly connected to the user equipment, the downstream node is an edge node. The edge node includes one user interface and one FlexE interface, the intermediate node includes two FlexE interfaces, and a user interface and a FlexE interface each include one transmit port and one interface port. In the embodiments of the present invention, for each FlexE interface, a transmit port of the FlexE interface is bound to a primary sending slot table and a secondary sending slot table, and a receive port of the FlexE interface is bound to a primary receiving slot table and a secondary receiving slot table. The primary sending slot table and the secondary sending slot table each indicate a configuration of a sending slot. The primary receiving slot table and the secondary receiving slot table each indicate a configuration of a receiving slot. The transmit port of each FlexE interface can send service data by using only one of the primary sending slot table and the secondary sending slot table to, and the receive port of the FlexE interface can receive service data by using only one of the primary receiving slot table and the secondary receiving slot table.

The NMS is configured to manage each NE in the FlexE communications system, and send various control data to each NE, to control each NE to perform a corresponding operation. The NMS is an entrance for human-computer interaction between a user and the FlexE communications system.

In the FlexE communications system, a dedicated client channel may be established between two user equipments that need to communicate with each other. The client channel is a bidirectional channel, and the client channel includes a forward channel and a backward channel. The two user equipments may receive service data and send service data on the client channel in a full-duplex manner, in other words, the two user equipments may transmit the service data through both the forward channel and the backward channel. The forward channel and the backward channel are two relative concepts, and the forward channel and the backward channel may be replaced with each other. A transmission channel in the embodiments of the present invention may be a forward channel or may be a backward channel. In the following description, unless otherwise specified, the transmission channel may be a forward channel or a backward channel.

A type of a network node on a transmission channel is determined based on a flow direction of service data on the transmission channel. There are a source node, an intermediate node, and a destination node on a path of the transmission channel. When there is a same node on paths of two transmission channels and flow directions of service data on the two transmission channels are opposite, a source node on one transmission channel is a destination node on the other transmission channel, and a destination node on one transmission channel is a source node on the other transmission channel.

For example, referring to a schematic structural diagram of a FlexE communications system shown in FIG. 1a, the FlexE communications system includes user equipment 4, a node 1, a node 2, a node 3, user equipment 5, and a network management system 6. The node 1 may be an intermediate node, and in this case, the node 1 is connected to the user equipment 4 by using another network node. The node 1 may also be an edge node, and in this case, the node 1 is directly connected to the user equipment 4. The node 3 may be an intermediate node, and in this case, the node 3 is connected to the user equipment 5 by using another network node. The node 3 may also be an edge node, and in this case, the node 3 is directly connected to the user equipment 5. The node 1 includes a FlexE interface 1, the node 2 includes a FlexE interface 2 and a FlexE interface 3, and the node 3 includes a FlexE interface 4. The FlexE interface 1 is adjacent to the FlexE interface 2, and the Flex interface 3 is adjacent to the FlexE interface 4. Each of the FlexE interface 1 to the FlexE interface 4 includes a transmit port and a receive port.

A client channel includes a forward channel and a backward channel. A flow direction of service data on the forward channel is shown by a solid line arrow in FIG. 1a, and a flow direction of service data on the backward channel is shown by a dashed line arrow in FIG. 1a. In an example, the transmission channel is a forward channel in this embodiment of the present invention. A flow direction of service data on the transmission channel is: the user equipment 4→the node 1→the node 2→the node 3→the user equipment 5. The node 1 is a source node, the node 2 is an intermediate node, and the node 3 is a destination node. On the transmission channel, it is assumed that a transmit port of the FlexE interface 1 is bound to a primary sending slot table 1 and a secondary sending slot table 1, a receive port of the FlexE interface 2 is bound to a primary receiving slot table 2 and a secondary receiving slot table 2, a transmit port of the FlexE interface 3 is bound to a primary sending slot table 3 and a secondary sending slot table 3, and a receive port of the FlexE interface 4 is bound to a primary receiving slot table 4 and a secondary receiving slot table 4.

FIG. 1b-1 to FIG. 1b-3 are a schematic structural diagram of a network node according to an embodiment of the present invention. In this embodiment, an example in which the node 1 and the node 3 are edge nodes, and the node 2 is an intermediate node is used for description. An edge node (a destination node or a source node) and an intermediate node are in different structures. An edge node is used as an example for description. The edge node includes a FlexE interface, a user interface, a control and management module, a rate adaptation module, and a Flex E cross-connection module.

The "control and management module" is a control center, and the "control and management module" may communicate with the network management system 6. The "control and management module" is mainly configured to control and manage modules in the edge node.

The "user interface" includes a "66B transcoding module" and a "user interface bottom-layer processing module". The "66B transcoding module" is used for format conversion on a client channel, and is further configured to implement an insertion and extraction function during operation administration and maintenance (OAM) on the client channel. After 66B transcoding is performed on service data, OAM information such as a type of the client channel, an identifier of a source node, and an identifier of a destination node is also inserted into the client channel by using a specific OAM block. Subsequently, each node may obtain related information of the client channel by extracting the OAM block. The OMA block is inserted and extracted by replacing an idle block, and a bandwidth of the client channel is not changed. The "user interface bottom layer processing module" is configured to perform bottom layer processing according to a corresponding user interface standard, to implement a connection to a user equipment interface.

The "rate adaptation module" is mainly configured to implement rate adaptation at an ingress and an egress through idle block adding or deleting. The "rate adaptation module" includes two sub-modules each in a sending direction and a receiving direction. The "rate adaptation module" may adjust an output rate of the rate adaptation module based on a target requirement. For example, if the bandwidth allocated to the client channel is 10G, the output rate of the "rate adaptation module" is set to 10G. When an ingress rate is less than 10G, an idle block is added to increase to 10G. This process is lossless. When the ingress rate is greater than 10G, an idle block is deleted. When idle blocks are insufficient, a data block is also discarded. This process may cause a service loss. During bandwidth adjustment, the ingress rate needs to be less than or equal to an egress rate.

The "FlexE cross-connection module" is configured to implement any cross-connection between client channels. Only cross-connection between any ports is implemented, a service rate of the client channel is not changed, and a cross-connection relationship of the client channel during bandwidth adjustment is not changed. However, a bandwidth of the client channel can be adjusted.

The FlexE interface includes a transmit port (MUX) and a receive port (DEMUX). A difference from a conventional Ethernet interface lies in that one FlexE interface can implement bearing of a plurality of client channels, and a FlexE interface serving as a logical interface may be combined by a plurality of physical interfaces.

A difference between the intermediate node and the edge node lies only in that a "user interface" is replaced with a "FlexE interface". For functions of modules in the intermediate node, refer to the description of the edge node.

Figures 1, 1B, 2:
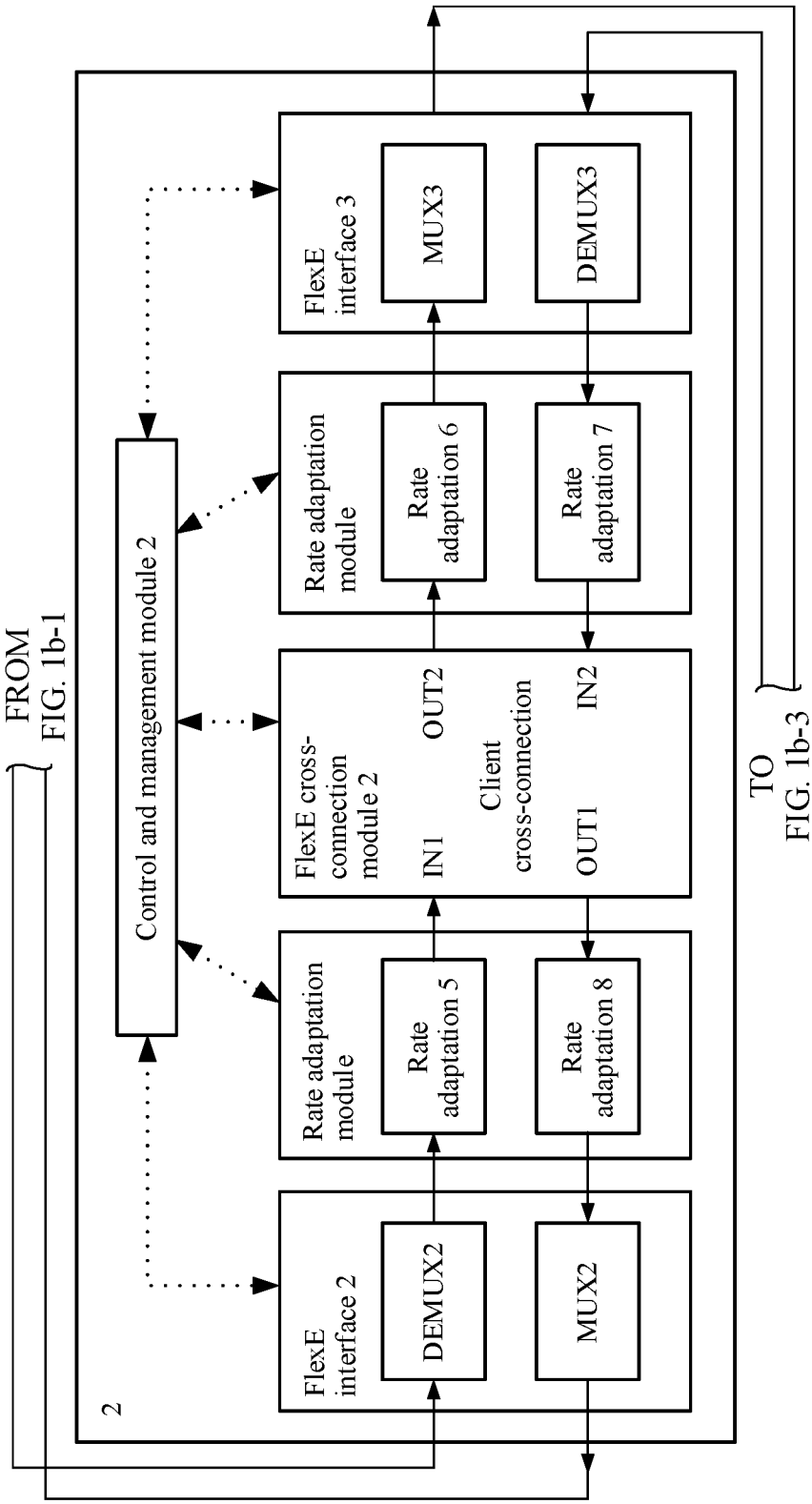

FIG. 2 is a schematic flowchart of a method for increasing a bandwidth of a transmission channel in flexible Ethernet according to an embodiment of the present invention. There are an upstream node, an intermediate node, and a downstream node on the transmission channel in this embodiment of the present invention, the intermediate node is located between the upstream node and the downstream node, and the intermediate node is adjacent to the upstream node and the downstream node. A flow direction of service data on the transmission channel is: the upstream node→the intermediate node→the downstream node. The upstream node includes a first FlexE interface, the intermediate node includes a second FlexE interface and a third FlexE interface, and the downstream node includes a fourth FlexE interface. The first FlexE interface is adjacent to the second FlexE interface, and the third FlexE interface is adjacent to the fourth FlexE interface. The upstream node is connected to the intermediate node through the first FlexE interface and the second FlexE interface, and the intermediate node is connected to the downstream node through the third FlexE interface and the fourth FlexE interface. The first FlexE interface includes a first transmit port and a first receive port, the second FlexE interface includes a second transmit port and a second receive port, the third FlexE interface includes a third transmit port and a third receive port, and the fourth FlexE interface includes a fourth transmit port and a fourth receive port. The first transmit port is bound to a first primary sending slot table and a first secondary sending slot table, the second receive port is bound to a first primary receiving slot table and a first secondary receiving slot table, the third transmit port is bound to a second primary sending slot table and a second secondary sending slot table, and the fourth receive port is bound to a second primary receiving slot table and a second secondary receiving slot table.

In this application, the bandwidth of the transmission channel needs to be increased. Therefore, a bandwidth indicated by the first secondary sending slot table is greater than a bandwidth indicated by the first primary sending slot table, a bandwidth indicated by the first secondary receiving slot table is greater than a bandwidth indicated by the first primary receiving slot table, a bandwidth indicated by the second secondary sending slot table is greater than a bandwidth indicated by the second primary sending slot table, and a bandwidth indicated by the second secondary receiving slot table is greater than a bandwidth indicated by the second primary receiving slot table. In this embodiment of the present invention, a bandwidth indicated by a slot table may be determined based on a bandwidth corresponding to each slot and a quantity of slots in the slot table. For example, if the bandwidth corresponding to each slot is 5G, and four slots are configured in the slot table, the bandwidth indicated by the slot table is 20G. For another example, if two slots are configured in the slot table, the bandwidth indicated by the slot table is 10G.

Based on the transmission channel described above, the method in this embodiment of the present invention includes the following steps.

S201. The downstream node sends first indication information to the intermediate node, and the intermediate node receives the first indication information from the downstream node.

Specifically, the first indication information is used to instruct to increase the bandwidth of the transmission channel. The transmission channel may be a forward channel or a backward channel in a client channel, and a flow direction of service data on the transmission channel is: the upstream node→the intermediate node→the downstream node.

In a specific implementation, the downstream node may send the first indication information by using a FlexE overhead. For example, the overhead includes a bandwidth adjustment flag, and the bandwidth adjustment flag may be one or more bits. Different values of the bandwidth adjustment flag correspond to different bandwidth adjustment instructions. A value "1" of the bandwidth adjustment flag indicates a bandwidth increase instruction, and a value "0" of the bandwidth adjustment flag indicates a bandwidth decrease instruction. In another specific implementation, the overhead further includes an identifier of the transmission channel. When there are a plurality of transmission channels, an identifier of a transmission channel instructs to adjust a bandwidth of a specified transmission channel.

Control data between two adjacent nodes is sent by using FlexE overheads, and the overheads periodically appear. For example, one overhead appears after every 1023×20 service blocks. The service blocks are used to transmit service data, and the overheads are used to transmit the control data.

S202. The intermediate node sends second indication information to the downstream node, and the downstream node receives the second indication information from the intermediate node.

Specifically, the second indication information is used to instruct the downstream node to switch from the currently used second primary receiving slot table to the second secondary receiving slot table, and the second indication information may be sent by using a FlexE overhead.

In a possible implementation, the second indication information may be represented by a slot table status flag in the overhead, and the slot table status flag is one or more bits. A first value of the slot table status flag corresponds to a primary receiving slot table, and a second value of the slot table status flag corresponds to a secondary receiving slot table. It is assumed that the slot table status flag in the overhead is 1 bit. When a value of the slot table status flag is "1", the slot table status flag corresponds to the primary receiving slot table. When the value of the slot table status flag is "0", the slot table status flag corresponds to the secondary receiving slot table. The downstream node receives the FlexE overhead from the intermediate node and parses the value of the slot table status flag in the overhead. When the value of the slot table status flag is "0" and the downstream node currently receives service data by using the second primary receiving slot table, the downstream node needs to switch from the currently used second primary receiving slot table to the second secondary receiving slot table.

S203. The intermediate node switches from the currently used second primary sending slot table to the second secondary sending slot table.

Specifically, after sending the second indication information to the downstream node, the intermediate node switches from the currently used second primary sending slot table to the second secondary sending slot table, and the intermediate node sends service data to the downstream node by using a slot indicated by the second secondary sending slot table. The second indication information is sent to the downstream node by using a FlexE overhead, and the intermediate node sends the service data to the downstream node by using the second secondary sending slot table in a service block (for example, a 66B coded block) after the FlexE overhead by using which the second indication information is sent.

S204. The downstream node switches from the currently used second primary receiving slot table to the second secondary receiving slot table.

Specifically, after receiving the second indication information, the downstream node switches from the currently used second primary receiving slot table to the second secondary receiving slot table according to the second indication information, and the downstream node receives the service data from the intermediate node by using a slot indicated by the second secondary receiving slot table.

The downstream node receives the FlexE overhead from the intermediate node and parses the value of the slot table status flag in the overhead. When the value of the slot table status flag is inverted relative to a previous value and the downstream node currently receives the service data by using the second primary receiving slot table, the downstream node needs to switch from the second primary receiving slot table to the second secondary receiving slot table. The downstream node receives, in the service block (for example, a 66B coded block) after the overhead, the service data from the intermediate node by using the second secondary receiving slot table. Based on the description in S207, the intermediate node also sends, in the service block after the overhead, the service data to the downstream node by using the second secondary receiving slot table. In this way, the intermediate node and the downstream node can simultaneously switch to the secondary tables, and a bandwidth of a channel between the intermediate node and the downstream node is increased.

S205. The intermediate node sends third indication information to the upstream node, and the upstream node receives the third indication information from the intermediate node.

Specifically, after switching to the second secondary sending slot table, the intermediate node sends the third indication information to the upstream node. The third indication information is used to instruct the upstream node to increase the bandwidth of the transmission channel.

In a possible implementation, the third indication information may be sent by using a FlexE overhead, and the FlexE overhead includes a bandwidth adjustment flag. Different values of the bandwidth adjustment flag correspond to different bandwidth adjustment instructions. The bandwidth adjustment flag is a plurality of bits, and third indication information corresponds to a first value of the bandwidth adjustment flag. Further, the FlexE overhead further includes the identifier of the transmission channel. For example, the bandwidth adjustment flag is 2 bits. When a value of the bandwidth adjustment flag is "00", it indicates that the bandwidth of the transmission channel remains unchanged; when the value of the bandwidth adjustment flag is "01", it indicates that the bandwidth of the transmission channel is to be decreased; and when the value of the bandwidth adjustment flag is "10", it indicates that the bandwidth of the transmission channel is to be increased.

In this embodiment, control data between two adjacent nodes is sent by using FlexE overheads and does not occupy a service block, and the overheads periodically appear. One overhead appears after every 1023×20 service blocks, and the service blocks are used to transmit service data.

S206. The upstream node sends fourth indication information to the intermediate node, and the intermediate node receives the fourth indication information from the upstream node.

Specifically, the fourth indication information is used to instruct the intermediate node to switch from the currently used first primary receiving slot table to the first secondary receiving slot table. In a possible implementation, the fourth indication information may be sent by using a FlexE overhead. The fourth indication information may be represented by a slot table status flag in the overhead, and the slot table status flag is one or more bits. A first value of the slot table status flag corresponds to a primary receiving slot table, and a second value of the slot table status flag corresponds to a secondary receiving slot table. For example, the slot table status flag in the overhead is 1 bit. When a value of the slot table status flag is "1", the slot table status flag corresponds to the primary receiving slot table. When the value of the slot table status flag is "0", the slot table status flag corresponds to the secondary receiving slot table. When receiving the FlexE overhead from the upstream node, the intermediate node parses the value of the slot table status flag in the overhead. The intermediate node currently receives the service data from the upstream node by using the first primary receiving slot table. When the value of the slot table status flag is "0", it indicates that the intermediate node needs to switch from the currently used first primary receiving slot table to the first secondary receiving slot table.

S207. The upstream node switches from the currently used first primary sending slot table to the first secondary sending slot table.

Specifically, after sending the fourth indication information to the intermediate node, the upstream node switches from the currently used first primary sending slot table to the first secondary sending slot table. The fourth indication information is sent by using the FlexE overhead. After the overhead, the upstream node sends the service data to the intermediate node by using the first secondary sending slot table.

S208. The intermediate node switches from the currently used first primary receiving slot table to the first secondary receiving slot table.

Specifically, after receiving the fourth indication information from the upstream node, the intermediate node switches from the currently used first primary receiving slot table to the first secondary receiving slot table.

In a possible implementation, when receiving the FlexE overhead from the upstream node, the intermediate node parses the value of the slot table status flag in the overhead. When the value of the slot table status flag is inverted relative to a previous value and the intermediate node currently uses the first primary receiving slot table, the intermediate node determines that the intermediate node needs to switch from the currently used first primary receiving slot table to the first secondary receiving slot table. The intermediate node receives, in a service block after the overhead, the service data from the upstream node by using the first secondary receiving slot table. In addition, based on the description in S207, the upstream node also switches to the first secondary sending slot table after the overhead, to send the service data to the intermediate node. In this way, the upstream node and the intermediate node simultaneously switch to the secondary tables, thereby reducing a probability of a service data loss caused because an upstream bandwidth is greater than a downstream bandwidth, and improving reliability of service data transmission.

For a process of increasing a bandwidth of the backward channel in a direction from the downstream node to the intermediate node to the upstream node, refer to the process in this embodiment of the present invention. Details are not described. If bandwidths of the forward channel and backward channel are successfully increased, it indicates that a bandwidth of the client channel is successfully increased.

During implementation of this embodiment of the present invention, when the bandwidth of the channel needs to be increased, bandwidths of the nodes are successively increased based on a direction reverse to the flow direction of the service data, to ensure that a bandwidth of the downstream node is not less than a bandwidth of the upstream node, reduce a possibility of a loss caused by insufficient bandwidths in a process of sending the service data of the upstream node to the downstream node, and improve reliability of service data transmission.

In a specific implementation, after S201, the method further includes: S209. The downstream node synchronizes the second secondary receiving slot table based on the second secondary sending slot table.

Specifically, the downstream node synchronizes the second secondary receiving slot table based on the second secondary sending slot table, so that a slot indicated by the second secondary receiving slot table is consistent with the sending slot indicated by the second secondary sending slot table. After the intermediate node switches to the second secondary sending slot table through the synchronization and the downstream node switches to the second secondary receiving slot table through the synchronization, the third transmit port of the intermediate node and the fourth receive port of the downstream node transmit the service data on a same slot, to avoid a service data loss caused because a sending slot is different from a receiving slot.

In a specific implementation, after S205, the method further includes: S210. The intermediate node synchronizes the first secondary receiving slot table based on the first secondary sending slot table.

Specifically, the intermediate node synchronizes the first secondary receiving slot table based on the first secondary sending slot table, so that a receiving slot of the first secondary receiving slot table is consistent with a slot of the first secondary sending slot table. After the upstream node switches to the first secondary sending slot table through the synchronization and the intermediate node switches to the first secondary receiving slot table through the synchronization, the first transmit port of the upstream node and the second receive port of the intermediate node transmit the service data on a same slot, to avoid a service data loss caused because a sending slot is different from a receiving slot. Before the intermediate node synchronizes the first secondary receiving slot table based on the first secondary sending slot table, the method further includes: determining, by the intermediate node, that the slot indicated by the first secondary sending slot table is in an available state. The available state indicates that the slot is in an idle state, and the intermediate node can receive the service data from the upstream node by using the slot.

In a specific implementation, before S209, the method further includes the following step:

S211. The intermediate node sends fifth indication information and the second secondary sending slot table to the downstream node, where the fifth indication information is used to request the downstream node to switch from the currently used second primary receiving slot table to the second secondary receiving slot table.

The intermediate node receives sixth indication information from the downstream node, where the sixth indication information is used to indicate that the downstream node allows switching from the currently used second primary receiving slot table to the second secondary receiving slot table.

Specifically, the fifth indication information and the second secondary sending slot table may be carried by using a FlexE overhead. The fifth indication information and the second secondary sending slot table may be carried in a same FlexE overhead, or may be carried in different FlexE overheads. This is not limited in this embodiment of the present invention. The fifth indication information is used to request the downstream node to prepare to switch from the currently used second primary receiving slot table to the second secondary receiving slot table.

The sixth indication information indicates that the downstream node allows switching from the currently used second primary receiving slot table to the second secondary receiving slot table. In this case, the downstream node has not switched to the second secondary receiving slot table, and the downstream node still uses a slot indicated by the second primary receiving slot table to receive the service data from the intermediate node. The intermediate node receives the sixth indication information from the downstream node, and learns, according to the sixth indication information, that the downstream node allows switching from the currently used second primary receiving slot table to the second secondary receiving slot table.

In a specific implementation, before S205, the method further includes the following step:

S212. The intermediate node receives seventh indication information and the first secondary sending slot table from the upstream node, where the seventh indication information is used to request the intermediate node to switch from the currently used first primary receiving slot table to the first secondary receiving slot table.

Specifically, the seventh indication information and the first secondary sending slot table may be sent by using a FlexE overhead. The seventh indication information and the first secondary sending slot table may be carried in a same FlexE overhead, or may be carried in different FlexE overheads. This is not limited in the present invention. The seventh indication information is used to request the intermediate node to switch from the currently used first primary receiving slot table to the first secondary receiving slot table.

In a specific implementation, after S205, the method further includes the following step:

S213. The intermediate node sends eighth indication information to the upstream node, where the eighth indication information is used to indicate that the intermediate node allows switching from the currently used first primary receiving slot table to the first secondary receiving slot table.

Specifically, the eighth indication information indicates that the intermediate node allows switching from the currently used first primary receiving slot table to the first secondary receiving slot table. In this case, the intermediate node has not switched to the first secondary receiving slot table, and the intermediate node still uses a slot indicated by the first primary receiving slot table to receive the service data from the upstream node. The eighth indication information may be sent by using a FlexE overhead.

In a specific implementation, before S205, and before the intermediate node synchronizes the first secondary receiving slot table based on the first secondary sending slot table, the method further includes:

S214. The intermediate node determines that the slot indicated by the first secondary sending slot table is in an available state.

Specifically, the available state indicates that the slot is idle, the upstream node may send the service data on the slot indicated by the first secondary sending slot table, and the intermediate node may receive the service data from the upstream node on the same slot.

The first indication information and the third indication information are sent by using a FlexE overhead.

In a specific implementation, a FlexE overhead used to send the first indication information further includes the identifier of the transmission channel, and a FlexE overhead used to send the third indication information further includes the identifier of the transmission channel.

In a specific implementation, before S201, the method further includes the following step:

S215. The intermediate node receives sending slot configuration information from a network management system.

The intermediate node obtains the second secondary sending slot table based on the sending slot configuration information, and the bandwidth indicated by the configured second secondary sending slot table is greater than the bandwidth indicated by the second primary sending slot table.

Specifically, the sending slot configuration information herein is used to configure a slot of the second secondary sending slot table. The sending slot configuration information may be from the network management system or may be from another network element. This is not limited in this embodiment of the present invention. In this embodiment of the present invention, to increase the bandwidth of the transmission channel, a quantity of slots indicated by the configured second secondary sending slot table is greater than a quantity of slots indicated by the currently used second primary sending slot table. This step may also be performed before S210.

Figures 1, 1B, 2, 3:
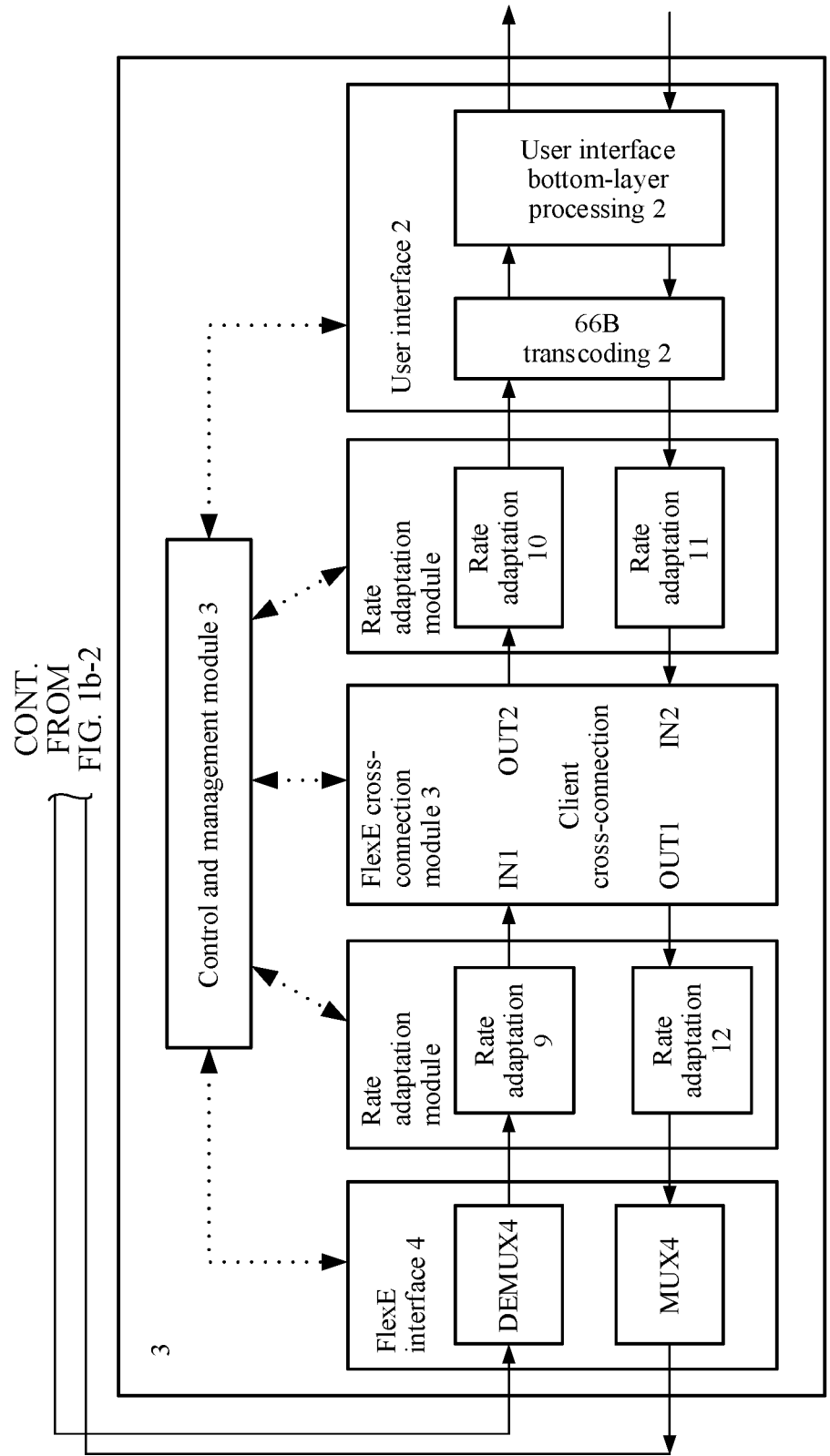
Figure 2:
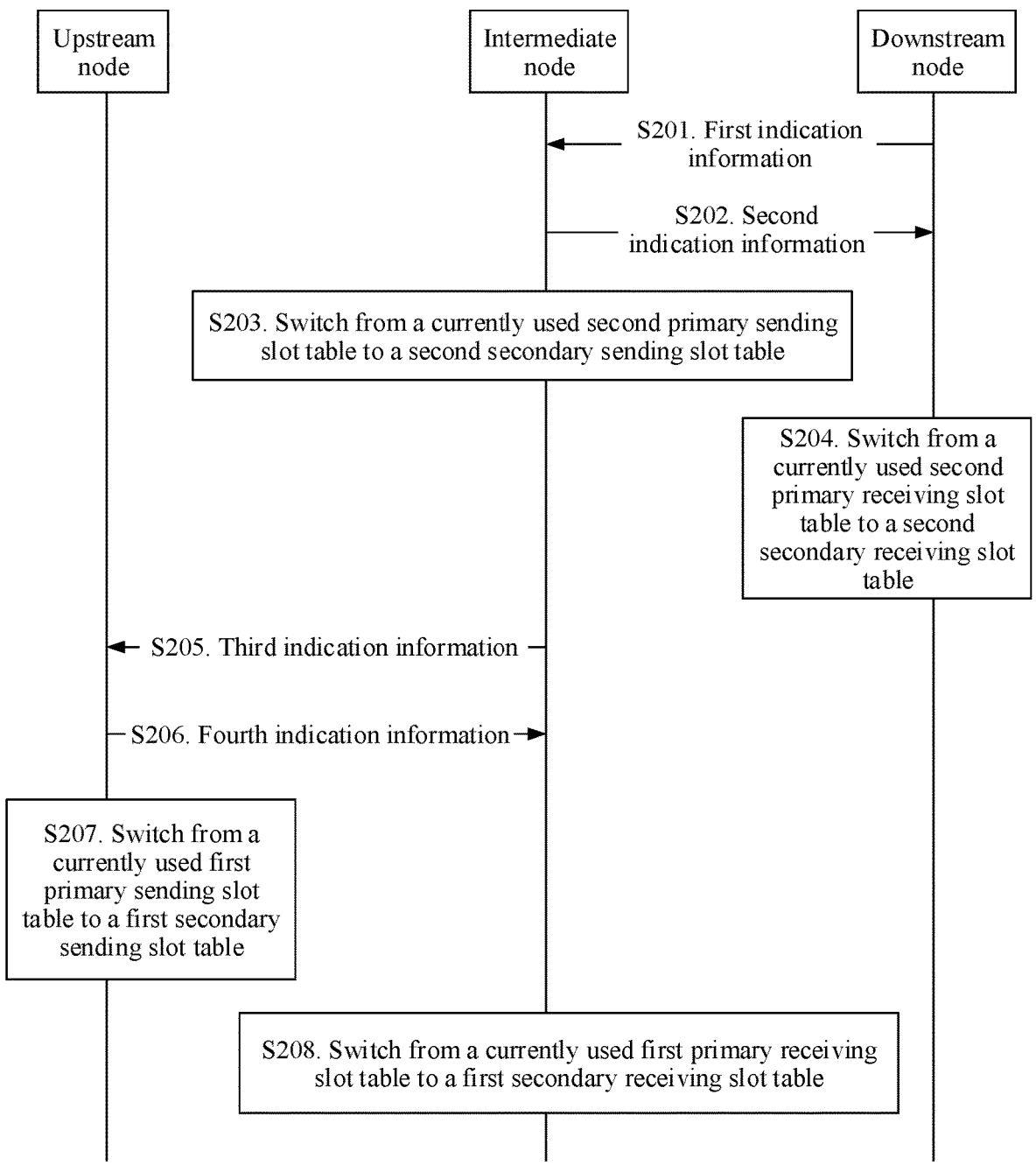
Figure 3:
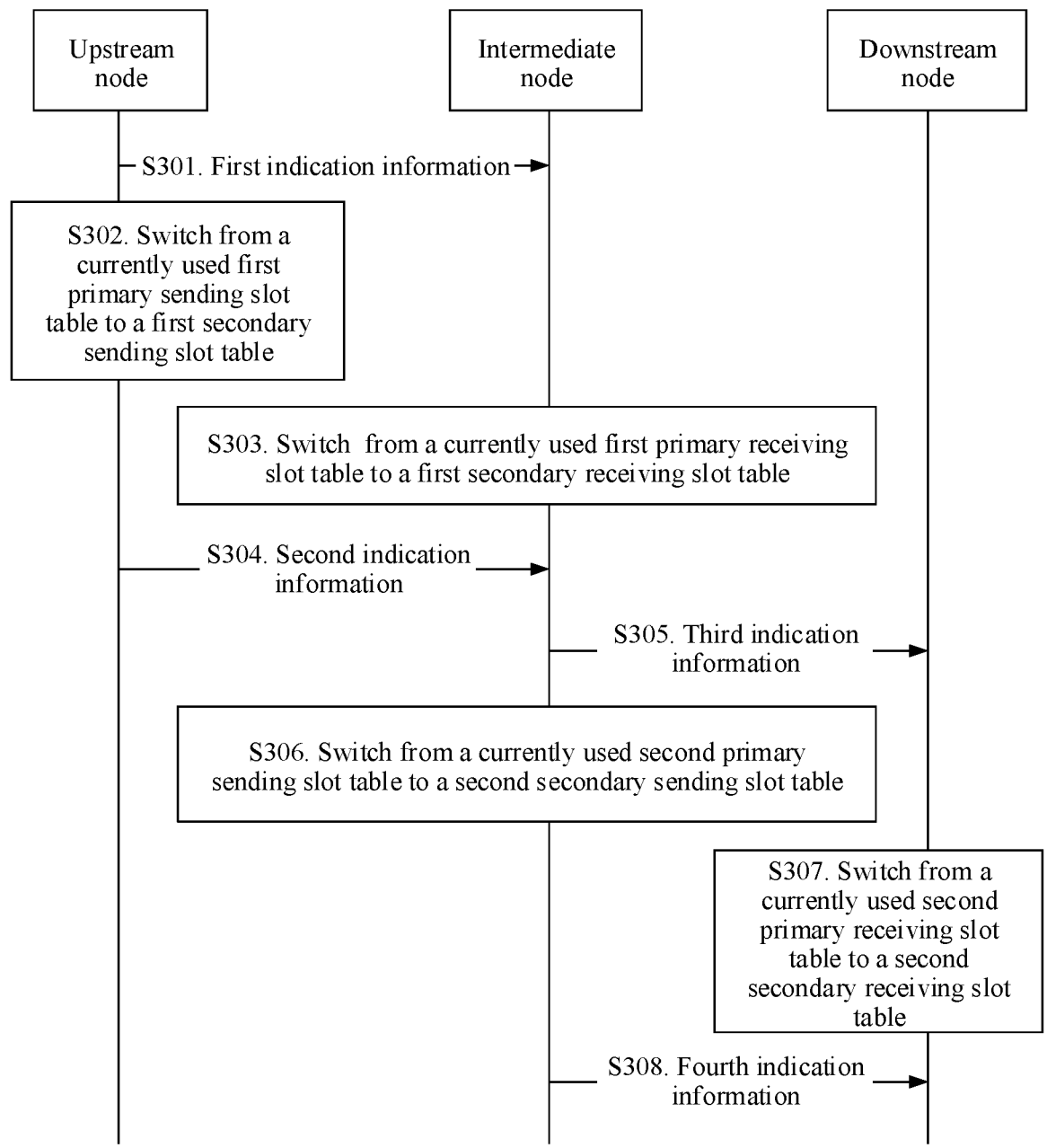

FIG. 3 is a schematic flowchart of a bandwidth decrease method according to an embodiment of the present invention. There are an upstream node, an intermediate node, and a downstream node on a transmission channel in this embodiment of the present invention, the intermediate node is located between the upstream node and the downstream node, and the intermediate node is adjacent to the upstream node and the downstream node. A flow direction of service data on the transmission channel is: the upstream node→the intermediate node→the downstream node. The upstream node includes a first FlexE interface, the intermediate node includes a second FlexE interface and a third FlexE interface, and the downstream node includes a fourth FlexE interface. The first FlexE interface is adjacent to the second FlexE interface, and the third FlexE interface is adjacent to the fourth FlexE interface. The upstream node is connected to the intermediate node through the first FlexE interface and the second FlexE interface, and the intermediate node is connected to the downstream node through the third FlexE interface and the fourth FlexE interface. The first FlexE interface includes a first transmit port and a first receive port, the second FlexE interface includes a second transmit port and a second receive port, the third FlexE interface includes a third transmit port and a third receive port, and the fourth FlexE interface includes a fourth transmit port and a fourth receive port. The first transmit port is bound to a first primary sending slot table and a first secondary sending slot table, the second receive port is bound to a first primary receiving slot table and a first secondary receiving slot table, the third transmit port is bound to a second primary sending slot table and a second secondary sending slot table, and the fourth receive port is bound to a second primary receiving slot table and a second secondary receiving slot table.

Based on the transmission channel described above, the method in this embodiment of the present invention includes the following steps.

S301. The upstream node sends first indication information to the intermediate node, and the intermediate node receives the first indication information from the upstream node.

Specifically, the first indication information is used to instruct the intermediate node to switch from the currently used first primary receiving slot table to the first secondary receiving slot table. The first indication information may be sent by using a FlexE overhead. The first indication information may be represented by a slot table status flag in the overhead, and the slot table status flag is one or more bits. A first value of the slot table status flag corresponds to a primary receiving slot table, and a second value of the slot table status flag corresponds to a secondary receiving slot table. For example, the slot table status flag in the overhead is 1 bit. When a value of the slot table status flag is "1", the slot table status flag corresponds to the primary receiving slot table. When the value of the slot table status flag is "0", the slot table status flag corresponds to the secondary receiving slot table. When receiving the FlexE overhead from the upstream node, the intermediate node parses the value of the slot table status flag in the overhead. The intermediate node currently uses the first primary receiving slot table to receive the service data from the upstream node. When the value of the slot table status flag is "0", it indicates that the intermediate node needs to switch from the currently used first primary receiving slot table to the first secondary receiving slot table.

S302. The upstream node switches from the currently used first primary sending slot table to the first secondary sending slot table.

Specifically, after sending the first indication information to the intermediate node, the upstream node switches from the currently used first primary sending slot table to the first secondary sending slot table. The first indication information is sent by using a FlexE overhead. After the overhead, the upstream node sends the service data to the intermediate node by using the first secondary sending slot table.

S303. The intermediate node switches from the currently used first primary receiving slot table to the first secondary receiving slot table.

Specifically, after receiving the first indication information from the upstream node, the intermediate node switches from the currently used first primary receiving slot table to the first secondary receiving slot table.

In a possible implementation, when receiving a FlexE overhead from the upstream node, the intermediate node parses a value of a slot table status flag in the overhead. When the value of the slot table status flag is inverted relative to a previous value and the intermediate node currently uses the first primary receiving slot table, the intermediate node determines that the intermediate node needs to switch from the currently used first primary receiving slot table to the first secondary receiving slot table. The intermediate node receives, in a service block after the overhead, the service data from the upstream node by using the first secondary receiving slot table. In addition, based on the description in S302, the upstream node also switches to the first secondary sending slot table after the overhead, to send the service data to the intermediate node. In this way, the upstream node and the intermediate node simultaneously switch to the secondary tables, thereby reducing a probability of a service data loss caused because an upstream bandwidth is greater than a downstream bandwidth, and improving reliability of service data transmission.

S304. The upstream node sends second indication information to the intermediate node, and the intermediate node receives the second indication information from the upstream node.

Specifically, the second indication information is used to instruct to decrease the bandwidth of the transmission channel. The transmission channel may be a forward channel or a backward channel in a client channel, and the flow direction of the service data on the transmission channel is the upstream node→the intermediate node→the downstream node.

The upstream node may send the second indication information by using a FlexE overhead. For example, the overhead includes a bandwidth adjustment flag, and the bandwidth adjustment flag may be one or more bits. Different values of the bandwidth adjustment flag correspond to different bandwidth adjustment instructions. A value "1" of the bandwidth adjustment flag indicates a bandwidth increase instruction, and a value "0" of the bandwidth adjustment flag indicates a bandwidth decrease instruction. Further, the overhead further includes an identifier of the transmission channel. When there are a plurality of transmission channels, an identifier of a transmission channel instructs to adjust a bandwidth of a specified transmission channel.

S305. The intermediate node sends third indication information to the downstream node, and the downstream node receives the third indication information from the intermediate node.

Specifically, the third indication information is used to instruct the downstream node to switch from the currently used second primary receiving slot table to the second secondary receiving slot table, and the third indication information may be sent by using a FlexE overhead.

The third indication information may be represented by a slot table status flag in the overhead, and the slot table status flag is one or more bits. A first value of the slot table status flag corresponds to a primary receiving slot table, and a second value of the slot table status flag corresponds to a secondary receiving slot table. It is assumed that the slot table status flag in the overhead is 1 bit. When a value of the slot table status flag is "1", the slot table status flag corresponds to the primary receiving slot table. When the value of the slot table status flag is "0", the slot table status flag corresponds to the secondary receiving slot table. The downstream node receives the FlexE overhead from the intermediate node and parses the value of the slot table status flag in the overhead. When the value of the slot table status flag is "0" and the downstream node currently uses the second primary receiving slot table to receive the service data, the downstream node needs to switch from the currently used second primary receiving slot table to the second secondary receiving slot table.

S306. The intermediate node switches from the currently used second primary sending slot table to the second secondary sending slot table.

Specifically, after sending the third indication information to the downstream node, the intermediate node switches from the currently used second primary sending slot table to the second secondary sending slot table, and the intermediate node sends the service data to the downstream node by using a slot indicated by the second secondary sending slot table. The third indication information is sent to the downstream node by using a FlexE overhead, and the intermediate node sends the service data to the downstream node by using the second secondary sending slot table in a service block (for example, a 66B coded block) after the FlexE overhead by using which the third indication information is sent.

S307. The downstream node switches from the currently used second primary receiving slot table to the second secondary receiving slot table.

Specifically, after receiving the third indication information, the downstream node switches from the currently used second primary receiving slot table to the second secondary receiving slot table according to the eighth indication information, and the downstream node receives the service data from the intermediate node by using a slot indicated by the second secondary receiving slot table.

The downstream node receives the FlexE overhead from the intermediate node and parses the value of the slot table status flag in the overhead. When the value of the slot table status flag is inverted relative to a previous value and the downstream node currently uses the second primary receiving slot table to receive the service data, the downstream node needs to switch from the second primary receiving slot table to the second secondary receiving slot table. The downstream node receives, in the service block (for example, a 66B coded block) after the overhead, the service data from the intermediate node by using the second secondary receiving slot table. Based on the description in S307, the intermediate node also sends, in the service block after the overhead, the service data to the downstream node by using the second secondary receiving slot table. In this way, the intermediate node and the downstream node simultaneously switch to the secondary tables, and a bandwidth of a channel between the intermediate node and the downstream node is decreased.

S308. The intermediate node sends fourth indication information to the downstream node, and the downstream node receives the fourth indication information from the intermediate node.

Specifically, after switching to the second secondary sending slot table, the intermediate node sends the fourth indication information to the downstream node. The fourth indication information is used to instruct the downstream node to decrease the bandwidth of the transmission channel.

In a possible implementation, the fourth indication information may be sent by using a FlexE overhead, and the FlexE overhead includes a bandwidth adjustment flag. Different values of the bandwidth adjustment flag correspond to different bandwidth adjustment instructions. The bandwidth adjustment flag is a plurality of bits, and the fourth indication information corresponds to a first value of the bandwidth adjustment flag. Further, the FlexE overhead further includes the identifier of the transmission channel. For example, the bandwidth adjustment flag is 2 bits. When a value of the bandwidth adjustment flag is "00", it indicates that the bandwidth of the transmission channel remains unchanged; when the value of the bandwidth adjustment flag is "01", it indicates that the bandwidth of the transmission channel is to be decreased; and when the value of the bandwidth adjustment flag is "10", it indicates that the bandwidth of the transmission channel is to be increased.

It should be noted that for a process of decreasing a bandwidth of a backward channel in a direction from the downstream node to the intermediate node to the upstream node, refer to the process in this embodiment of the present invention. Details are not described again. If bandwidths of the forward channel and the backward channel are successfully decreased, it indicates that a bandwidth of the client channel is successfully decreased.

During implementation of this embodiment of the present invention, when the bandwidth of the channel needs to be decreased, bandwidths of the nodes are successively decreased based on a direction reverse to the flow direction of the service data, to ensure that a downstream bandwidth is not less than an upstream bandwidth, reduce a possibility of a loss caused by insufficient bandwidths in a process of sending the service data of the upstream node to the downstream node, and improve reliability of service data transmission.

In a possible implementation, before S301, the method further includes: S309. The intermediate node synchronizes the first secondary receiving slot table based on the first secondary sending slot table.

Specifically, the intermediate node synchronizes the first secondary receiving slot table based on the first secondary sending slot table, so that a receiving slot of the first secondary receiving slot table is consistent with a slot of the first secondary sending slot table. After the upstream node switches to the first secondary sending slot table through the synchronization and the intermediate node switches to the first secondary receiving slot table through the synchronization, the first transmit port of the upstream node and the second receive port of the intermediate node transmit the service data on a same slot, to avoid a service data loss caused because a sending slot is different from a receiving slot. Before the intermediate node synchronizes the first secondary receiving slot table based on the first secondary sending slot table, the method further includes: determining, by the intermediate node, that the slot indicated by the first secondary sending slot table is in an available state. The available state indicates that the slot is in an idle state, and the intermediate node can receive the service data from the upstream node by using the slot.

In a possible implementation, after S304, the method further includes:

S310: The downstream node synchronizes the second secondary receiving slot table based on the second secondary sending slot table.

Specifically, the downstream node synchronizes the second secondary receiving slot table based on the second secondary sending slot table, so that a slot indicated by the second secondary receiving slot table is consistent with the sending slot indicated by the second secondary sending slot table. After the intermediate node switches to the second secondary sending slot table through the synchronization and the downstream node switches to the second secondary receiving slot table through the synchronization, the third transmit port of the intermediate node and the fourth receive port of the downstream node transmit the service data on a same slot, to avoid a service data loss caused because a sending slot is different from a receiving slot.

Before the downstream node synchronizes the second secondary receiving slot table based on the second secondary sending slot table, the method further includes: determining, by the downstream node, that the slot indicated by the second secondary sending slot table is in an available state. The available state indicates that the slot is idle and may be used by the downstream node to receive the service data.

In a possible implementation, before S309, the method further includes the following step:

S311. The intermediate node receives the first secondary sending slot table and fifth indication information from the upstream node, where the fifth indication information is used to request the intermediate node to switch from the currently used first primary receiving slot table to the first secondary receiving slot table.

Specifically, the fifth indication information and the first secondary sending slot table may be sent by using a FlexE overhead. The fifth indication information and the first secondary sending slot table may be carried in a same overhead, or may be carried in different FlexE overheads. This is not limited in the present invention. The fifth indication information is used to request the intermediate node to switch from the currently used first primary receiving slot table to the first secondary receiving slot table.

In a possible implementation, control data between two adjacent nodes is sent by using FlexE overheads, and the overheads periodically appear. One overhead appears after every 1023×20 service blocks, the service blocks are used to transmit service data, and the overheads are used to transmit the control data.

In a specific implementation, after S309, the method further includes the following step:

S312. The intermediate node sends sixth indication information to the upstream node, where the sixth indication information is used to indicate that the intermediate node allows switching from the currently used first primary receiving slot table to the first secondary receiving slot table.

Specifically, the sixth indication information indicates that the intermediate node allows switching from the currently used first primary receiving slot table to the first secondary receiving slot table. In this case, the intermediate node has not switched to the first secondary receiving slot table, and the intermediate node still receives the service data from the upstream node by using a slot indicated by the first primary receiving slot table. The sixth indication information may be sent by using a FlexE overhead.

In a specific implementation, before S310, the method further includes the following step:

S313. The intermediate node sends seventh indication information and the second secondary sending slot table to the downstream node, where the seventh indication information is used to request the downstream node to switch from the currently used second primary receiving slot table to the second secondary receiving slot table.

The intermediate node receives eighth indication information from the downstream node, and the eighth indication information is used to indicate that the downstream node allows switching from the currently used second primary receiving slot table to the second secondary receiving slot table.

Specifically, the seventh indication information and the second secondary sending slot table may be carried in a FlexE overhead. The seventh indication information and the second secondary sending slot table may be carried in a same FlexE overhead, or may be carried in different FlexE overheads. This is not limited in this embodiment of the present invention. The seventh indication information is used to request the downstream node to switch from the currently used second primary receiving slot table to the second secondary receiving slot table.

The eighth indication information indicates that the downstream node allows switching from the currently used second primary receiving slot table to the second secondary receiving slot table. In this case, the downstream node has not switched to the second secondary receiving slot table, and the downstream node still receives the service data from the intermediate node by using a slot indicated by the second primary receiving slot table. The intermediate node receives the eighth indication information from the downstream node, and learns, according to the eighth indication information, that the downstream node allows switching from the currently used second primary receiving slot table to the second secondary receiving slot table.

In a specific implementation, the first indication information and the third indication information each are carried in a FlexE overhead.

Specifically, the first indication information and the third indication information are control information, and the control information is sent by using a FlexE overhead. In a possible implementation, a block used to carry the FlexE overhead appears after each 1023×20 service blocks.

In a specific implementation, a FlexE overhead used to send the first indication information further includes the identifier of the transmission channel, and a FlexE overhead used to send the third indication information further includes the identifier of the transmission channel.

Specifically, when there are a plurality of transmission channels between the upstream node and the downstream node, a bandwidth of a specified transmission channel may be adjusted by using the identifier of the transmission channel.

In a specific implementation, before S309, the method further includes the following step:

S314. The intermediate node receives sending slot configuration information from a network management system.

The intermediate node obtains the second secondary sending slot table based on the sending slot configuration information, and the bandwidth indicated by the configured second secondary sending slot table is less than the bandwidth indicated by the second primary sending slot table.

Specifically, the sending slot configuration information is used to configure the slot of the second secondary sending slot table. The sending slot configuration information is from the network management system or may be from another network element. This is not limited in this embodiment of the present invention. In this embodiment of the present invention, to decrease the bandwidth of the transmission channel, a quantity of slots indicated by the configured second secondary sending slot table is less than a quantity of slots indicated by the currently used second primary sending slot table.

Figure 4:
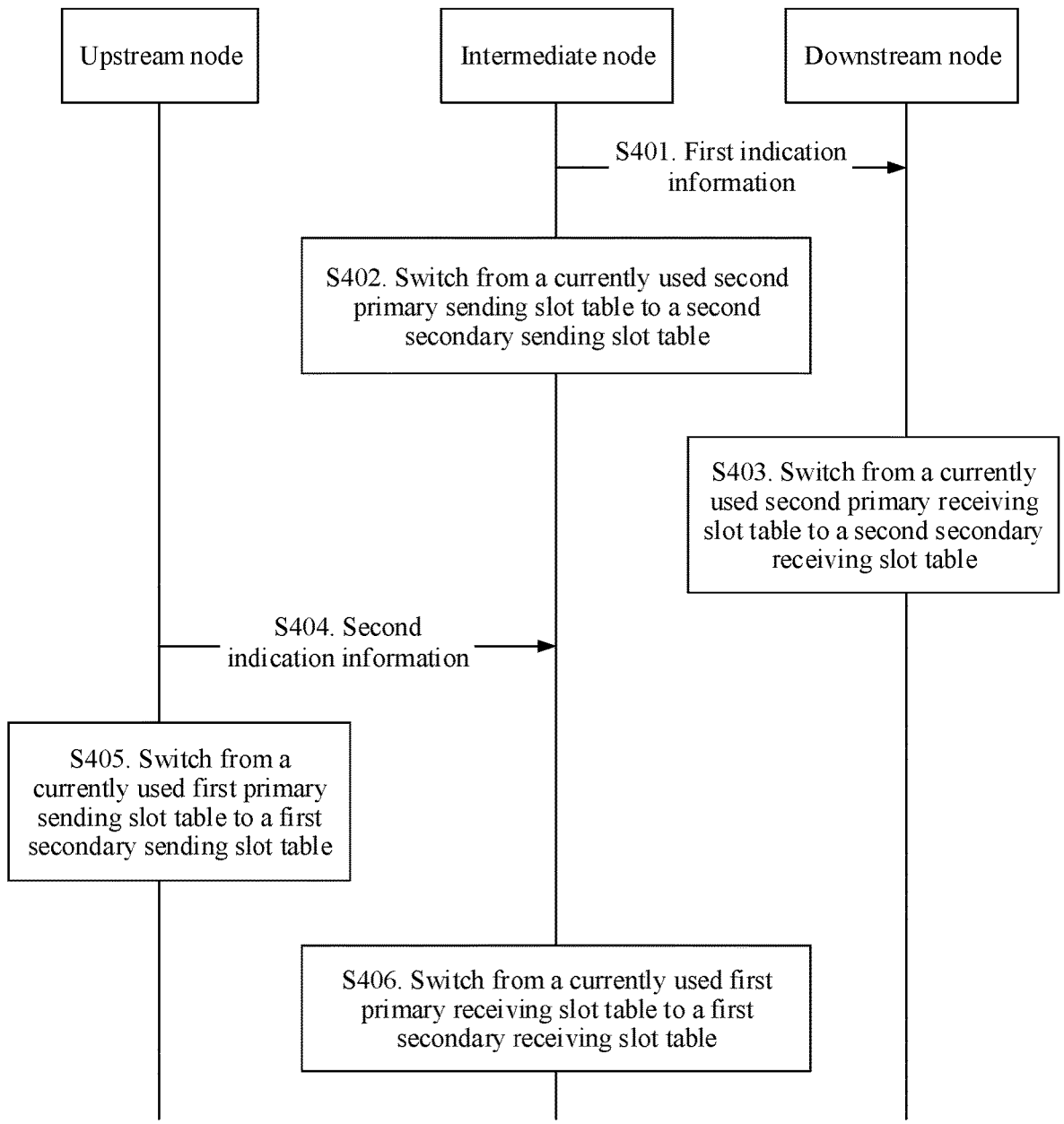
FIG. 4 is another schematic interaction diagram of adjusting a bandwidth of a transmission channel in flexible Ethernet according to an embodiment of the present invention.

FIG. 4 is a schematic interaction diagram of a bandwidth increasing method according to an embodiment of the present invention. There are an upstream node, an intermediate node, and a downstream node on a transmission channel in this embodiment of the present invention, the intermediate node is located between the upstream node and the downstream node, and the intermediate node is adjacent to the upstream node and the downstream node. A flow direction of service data on the transmission channel is: the upstream node→the intermediate node→the downstream node. The upstream node includes a first FlexE interface, the intermediate node includes a second FlexE interface and a third FlexE interface, and the downstream node includes a fourth FlexE interface. The first FlexE interface is adjacent to the second FlexE interface, and the third FlexE interface is adjacent to the fourth FlexE interface. The upstream node is connected to the intermediate node through the first FlexE interface and the second FlexE interface, and the intermediate node is connected to the downstream node through the third FlexE interface and the fourth FlexE interface. The first FlexE interface includes a first transmit port and a first receive port, the second FlexE interface includes a second transmit port and a second receive port, the third FlexE interface includes a third transmit port and a third receive port, and the fourth FlexE interface includes a fourth transmit port and a fourth receive port. The first transmit port is bound to a first primary sending slot table and a first secondary sending slot table, the second receive port is bound to a first primary receiving slot table and a first secondary receiving slot table, the third transmit port is bound to a second primary sending slot table and a second secondary sending slot table, and the fourth receive port is bound to a second primary receiving slot table and a second secondary receiving slot table.

In this application, a bandwidth of the transmission channel needs to be increased. Therefore, a bandwidth indicated by the first secondary sending slot table is greater than a bandwidth indicated by the first primary sending slot table, a bandwidth indicated by the first secondary receiving slot table is greater than a bandwidth indicated by the first primary receiving slot table, a bandwidth indicated by the second secondary sending slot table is greater than a bandwidth indicated by the second primary sending slot table, and a bandwidth indicated by the second secondary receiving slot table is greater than a bandwidth indicated by the second primary receiving slot table. In this embodiment of the present invention, a bandwidth indicated by a slot table may be determined based on a bandwidth corresponding to each slot in the slot table and a quantity of slots. For example, if the bandwidth corresponding to each slot is 5G, and four slots are configured in the slot table, the bandwidth indicated by the slot table is 20G. For another example, if two slots are configured in the slot table, the bandwidth indicated by the slot table is 10G.

Based on the transmission channel described above, the method in this embodiment of the present invention includes the following steps.

S401. The intermediate node sends first indication information to the downstream node, and the downstream node receives the first indication information from the intermediate node.

Specifically, the first indication information is used to instruct the downstream node to switch from the currently used second primary receiving slot table to the second secondary receiving slot table, and the first indication information may be sent by using a FlexE overhead.

In a possible implementation, the first indication information may be represented by a slot table status flag in the overhead, and the slot table status flag is one or more bits. A first value of the slot table status flag corresponds to a primary receiving slot table, and a second value of the slot table status flag corresponds to a secondary receiving slot table. In an example, the slot table status flag in the FlexE overhead is 1 bit. When a value of the slot table status flag is "1", the slot table status flag corresponds to the primary receiving slot table. When the value of the slot table status flag is "0", the slot table status flag corresponds to the secondary receiving slot table. The downstream node receives the FlexE overhead from the intermediate node and parses the value of the slot table status flag in the overhead. When the value of the slot table status flag is "0" and the downstream node currently uses the second primary receiving slot table to receive service data, the downstream node needs to switch from the currently used second primary receiving slot table to the second secondary receiving slot table.

S402. The intermediate node switches from the currently used second primary sending slot table to the second secondary sending slot table.

Specifically, after sending first indication information to the downstream node, the intermediate node switches from the currently used second primary sending slot table to the second secondary sending slot table, and the intermediate node sends the service data to the downstream node by using a slot indicated by the second secondary sending slot table. The first indication information is sent to the downstream node by using the FlexE overhead, and the intermediate node sends the service data to the downstream node by using the second secondary sending slot table in a service block (for example, a 66B coded block) after the FlexE overhead by using which the fourth indication information is sent.

S403. The downstream node switches from the currently used second primary receiving slot table to the second secondary receiving slot table.

Specifically, after receiving the first indication information, the downstream node switches from the currently used second primary receiving slot table to the second secondary receiving slot table according to the first indication information, and the downstream node receives the service data from the intermediate node by using a slot indicated by the second secondary receiving slot table.

In a possible implementation, the downstream node receives the FlexE overhead from the intermediate node and parses the value of the slot table status flag in the overhead. When the value of the slot table status flag is inverted relative to a previous value and the downstream node currently uses the second primary receiving slot table to receive the service data, the downstream node needs to switch from the second primary receiving slot table to the second secondary receiving slot table. The downstream node receives, in the service code block (for example, a 66B coded block) after the overhead, the service data from the intermediate node by using the second secondary receiving slot table. Based on the foregoing description, the intermediate node also sends, in the service block after the overhead, the service data to the downstream node by using the second secondary receiving slot table. In this way, the intermediate node and the downstream node simultaneously switch to the secondary tables, and a bandwidth of a channel between the intermediate node and the downstream node is increased.

S404. The upstream node sends second indication information to the intermediate node, and the intermediate node receives the second indication information from the upstream node.

Specifically, the second indication information is used to instruct the intermediate node to switch from the currently used first primary receiving slot table to the first secondary receiving slot table. The second indication information may be sent by using a FlexE overhead. The second indication information may be represented by a slot table status flag in the overhead, and the slot table status flag is one or more bits. A first value of the slot table status flag corresponds to a primary receiving slot table, and a second value of the slot table status flag corresponds to a secondary receiving slot table. For example, the slot table status flag in the overhead is 1 bit. When a value of the slot table status flag is "1", the slot table status flag corresponds to the primary receiving slot table. When the value of the slot table status flag is "0", the slot table status flag corresponds to the secondary receiving slot table. When receiving the FlexE overhead from the upstream node, the intermediate node parses the value of the slot table status flag in the overhead. The intermediate node currently uses the first primary receiving slot table to receive the service data from the upstream node. When the value of the slot table status flag is "0", it indicates that the intermediate node needs to switch from the currently used first primary receiving slot table to the first secondary receiving slot table.

S405. The upstream node switches from the currently used first primary sending slot table to the first secondary sending slot table.

Specifically, after sending the second indication information to the intermediate node, the upstream node switches from the currently used first primary sending slot table to the first secondary sending slot table. The second indication information is sent by using a FlexE overhead. After the overhead, the upstream node sends the service data to the intermediate node by using the first secondary sending slot table.

S406. The intermediate node switches from the currently used first primary receiving slot table to the first secondary receiving slot table.

Specifically, after receiving the second indication information from the upstream node, the intermediate node switches from the currently used first primary receiving slot table to the first secondary receiving slot table.

When receiving the FlexE overhead from the upstream node, the intermediate node parses the value of the slot table status flag in the overhead. When the value of the slot table status flag is inverted relative to a previous value and the intermediate node currently uses the first primary receiving slot table, the intermediate node determines that the intermediate node needs to switch from the currently used first primary receiving slot table to the first secondary receiving slot table. The intermediate node receives, in a service block after the overhead, the service data from the upstream node by using the first secondary receiving slot table. In addition, based on the description in S405, the upstream node also switches to the first secondary sending slot table after the overhead, to send the service data to the intermediate node. In this way, the upstream node and the intermediate node simultaneously switch to the secondary tables, thereby reducing a probability of a service data loss caused because an upstream bandwidth is greater than a downstream bandwidth, and improving reliability of service data transmission.

It should be noted that for a process of increasing a bandwidth of a backward channel in a direction from the downstream node to the intermediate node to the upstream node, refer to the process in this embodiment of the present invention. Details are not described again. If bandwidths of the forward channel and backward channel are successfully increased, it indicates that a bandwidth of a client channel is successfully increased.

During implementation of this embodiment of the present invention, when the bandwidth of the transmission channel needs to be increased, bandwidths of the nodes are successively increased based on a direction reverse to the flow direction of the service data, to ensure that a downstream bandwidth is not less than an upstream bandwidth, reduce a possibility of a loss caused by insufficient bandwidths in a process of sending the service data of the upstream node to the downstream node, and improve reliability of service data transmission.

In a specific implementation, before S401, the method further includes the following step:

S407. The downstream node synchronizes the second secondary receiving slot table based on the second secondary sending slot table.

Specifically, the downstream node synchronizes the second secondary receiving slot table based on the second secondary sending slot table, so that the slot indicated by the second secondary receiving slot table is consistent with the sending slot indicated by the second secondary sending slot table.

Before the downstream node synchronizes the second secondary receiving slot table based on the second secondary sending slot table, the method further includes: determining, by the downstream node, that the slot indicated by the second secondary sending slot table is in an available state. The available state indicates that the slot is idle and may be used by the downstream node to receive the service data.

In a specific implementation, before S401, the method further includes the following step:

S408. The intermediate node synchronizes the first secondary receiving slot table based on the first secondary sending slot table.

Specifically, the intermediate node synchronizes the first secondary receiving slot table based on the first secondary sending slot table, so that a receiving slot of the first secondary receiving slot table is consistent with a slot of the first secondary sending slot table. After the upstream node switches to the first secondary sending slot table through the synchronization and the intermediate node switches to the first secondary receiving slot table through the synchronization, the first transmit port of the upstream node and the second receive port of the intermediate node transmit the service data on a same slot, to avoid a service data loss caused because a sending slot is different from a receiving slot. Before the intermediate node synchronizes the first secondary receiving slot table based on the first secondary sending slot table, the method further includes: determining, by the intermediate node, that the slot indicated by the first secondary sending slot table is in an available state. The available state indicates that the slot is in an idle state, and the intermediate node can receive the service data from the upstream node by using the slot.

In a specific implementation, before S408, the method further includes the following step:

S409. The intermediate node receives sending slot configuration information from a network management system.

The intermediate node obtains the second secondary sending slot table based on the sending slot configuration information, and the bandwidth indicated by the configured second secondary sending slot table is greater than the bandwidth indicated by the second primary sending slot table.

Specifically, the sending slot configuration information is used to configure the slot of the second secondary sending slot table. The sending slot configuration information may be from the network management system, or may be from another network element. This is not limited in this embodiment of the present invention. In this embodiment of the present invention, to increase the bandwidth of the transmission channel, a quantity of slots indicated by the configured second secondary sending slot table is less than a quantity of slots indicated by the currently used first primary sending slot table.

In a specific implementation, before S408, the method further includes the following step:

S410. The upstream node sends third indication information and the first secondary sending slot table to the intermediate node, and the intermediate node receives the third indication information and the first secondary sending slot table from the upstream node. The intermediate node sends fourth indication information and the second secondary sending slot table to the downstream node, and the downstream node receives the fourth indication information and the second secondary sending slot table from the intermediate node.

Specifically, the third indication information and the first secondary sending slot table may be sent by using a FlexE overhead. The third indication information and the first secondary sending slot table may be sent by using a same FlexE overhead, or may be sent by using different FlexE overheads. This is not limited in the present invention. The third indication information is used to request the intermediate node to switch from the currently used first primary receiving slot table to the first secondary receiving slot table.

Specifically, the fourth indication information and the second secondary sending slot table may be carried in a FlexE overhead. The fourth indication information and the second secondary sending slot table may be carried in a same FlexE overhead, or may be carried in different FlexE overheads. This is not limited in this embodiment of the present invention. The fourth indication information is used to request the downstream node to switch from the currently used second primary receiving slot table to the second secondary receiving slot table.

In a specific implementation, after S408, the method further includes the following step:

S411. The intermediate node sends fifth indication information and the second secondary sending slot table to the downstream node, where the fifth indication information is used to request the downstream node to switch from the currently used second primary receiving slot table to the second secondary receiving slot table.

The intermediate node receives sixth indication information from the downstream node, where the sixth indication information is used to indicate that the downstream node allows switching from the currently used second primary receiving slot table to the second secondary receiving slot table.

The sixth indication information indicates that the downstream node allows switching from the currently used second primary receiving slot table to the second secondary receiving slot table. In this case, the downstream node has not switched to the second secondary receiving slot table, and the downstream node still receive the service data from the intermediate node by using a slot indicated by the second primary receiving slot table. The intermediate node receives the sixth indication information from the downstream node, and learns, according to the fifth indication information, that the downstream node allows switching from the currently used second primary receiving slot table to the second secondary receiving slot table.

Figure 5:
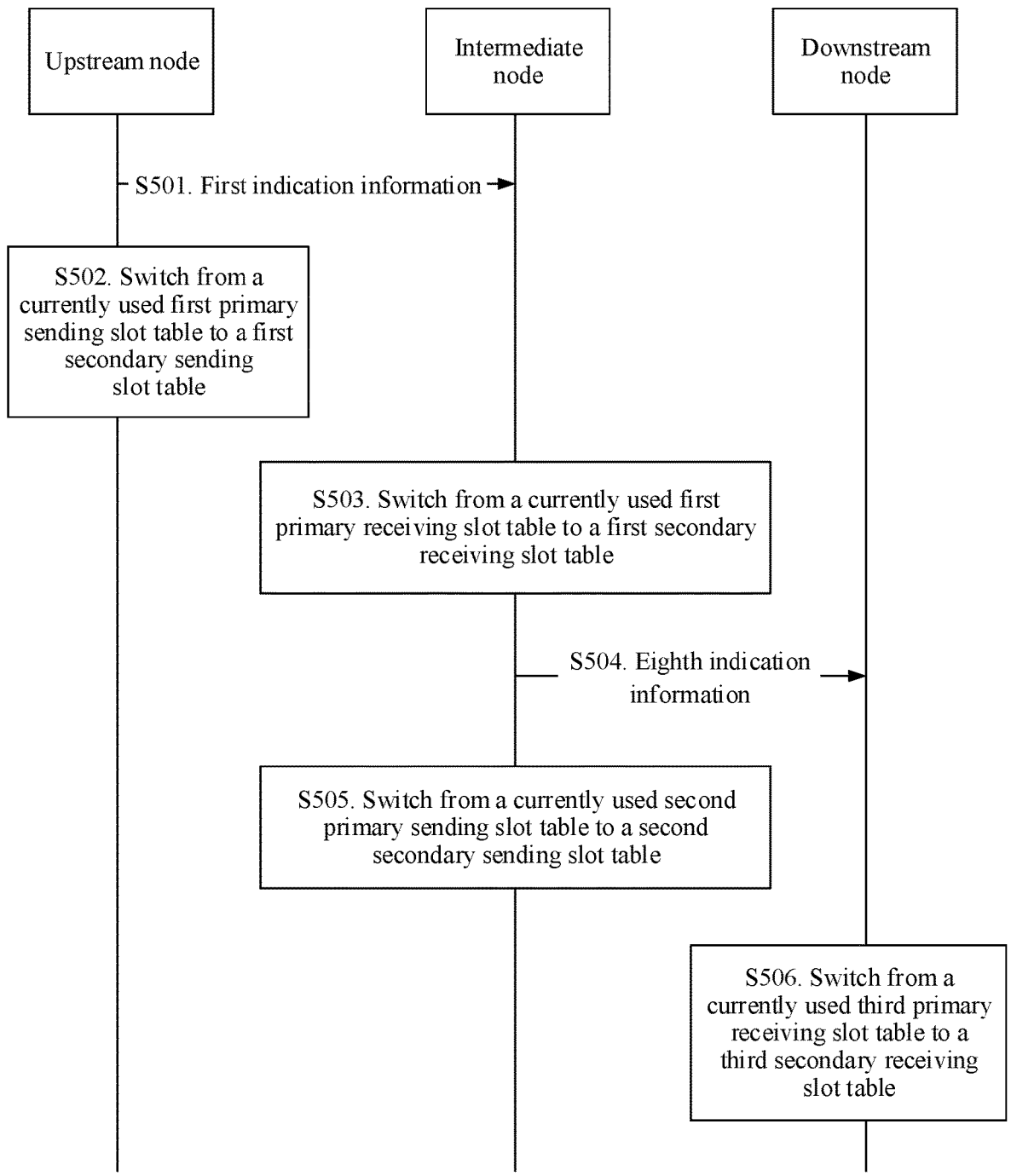
FIG. 5 is another schematic interaction diagram of adjusting a bandwidth of a transmission channel in flexible Ethernet according to an embodiment of the present invention.

FIG. 5 is a schematic interaction diagram of a method for decreasing a bandwidth of a transmission channel in flexible Ethernet according to an embodiment of the present invention. There are an upstream node, an intermediate node, and a downstream node on the transmission channel in this embodiment of the present invention, the intermediate node is located between the upstream node and the downstream node, and the intermediate node is adjacent to the upstream node and the downstream node. A flow direction of service data on the transmission channel is: the upstream node→the intermediate node→the downstream node. The upstream node includes a first FlexE interface, the intermediate node includes a second FlexE interface and a third FlexE interface, and the downstream node includes a fourth FlexE interface. The upstream node is connected to the intermediate node through the first FlexE interface and the second FlexE interface, and the intermediate node is connected to the downstream node through the third FlexE interface and the fourth FlexE interface. The first FlexE interface includes a first transmit port and a first receive port, the second Flex interface includes a second transmit port and a second receive port, the third FlexE interface includes a third transmit port and a third receive port, and the fourth FlexE interface includes a fourth transmit port and a fourth receive port. The first transmit port is bound to a first primary sending slot table and a first secondary sending slot table, the second receive port is bound to a first primary receiving slot table and a first secondary receiving slot table, the third transmit port is bound to a second primary sending slot table and a second secondary sending slot table, and the fourth receive port is bound to a second primary receiving slot table and a second secondary receiving slot table.

In this application, the bandwidth of the transmission channel needs to be decreased. Therefore, a bandwidth indicated by the first secondary sending slot table is less than a bandwidth indicated by the first primary sending slot table, a bandwidth indicated by the first secondary receiving slot table is less than a bandwidth indicated by the first primary receiving slot table, a bandwidth indicated by the second secondary sending slot table is less than a bandwidth indicated by the second primary sending slot table, and a bandwidth indicated by the second secondary receiving slot table is less than a bandwidth indicated by the second primary receiving slot table. In this embodiment of the present invention, a bandwidth indicated by a slot table may be determined based on a bandwidth corresponding to each slot in the slot table and a quantity of slots. For example, if the bandwidth corresponding to each slot is 5G, and four slots are configured in the slot table, the bandwidth indicated by the slot table is 20G. For another example, if two slots are configured in the slot table, the bandwidth indicated by the slot table is 10G.

Based on the transmission channel described above, the method in this embodiment of the present invention includes the following steps.

S501. The upstream node sends first indication information to the intermediate node, and the intermediate node receives the first indication information from the upstream node.

S502. The upstream node switches from the currently used first primary sending slot table to the first secondary sending slot table.

S503. The intermediate node switches from the currently used first primary receiving slot table to the first secondary receiving slot table.

S504. The intermediate node sends eighth indication information to the downstream node, and the downstream node receives the eighth indication information from the intermediate node.

S505. The intermediate node switches from the currently used second primary sending slot table to the second secondary sending slot table.

S506. The downstream node switches from the currently used second primary receiving slot table to the second secondary receiving slot table.

It should be noted that a difference between the embodiment in FIG. 5 and that in FIG. 3 lies only in that, after the intermediate node switches from the currently used first primary receiving slot table to the first secondary receiving slot table, and receives the service data from the upstream node by using the first secondary receiving slot table, the upstream node does not send a bandwidth decrease instruction to the intermediate node. In addition, after the downstream node switches from the currently used second primary receiving slot table to the second secondary receiving slot table, and receives service data from the intermediate node by using the second secondary receiving slot table, the intermediate node does not send a bandwidth decrease instruction to the downstream node. For specific implementations of other steps in FIG. 5, refer to the description in FIG. 3. Details are not described herein again.

During implementation of this embodiment of the present invention, when the bandwidth of the transmission channel needs to be decreased, bandwidths of the nodes are decreased based on a direction reverse to the flow direction of the service data, to ensure that a downstream bandwidth is not less than an upstream bandwidth, reduce a possibility of a loss caused by insufficient bandwidths in a process of sending the service data of the upstream node to the downstream node, and improve reliability of service data transmission.

In a possible implementation, before S501, the method further includes:

S507. The intermediate node synchronizes the first secondary receiving slot table based on the first secondary sending slot table.

In a possible implementation, before S504, the method further includes:

S508. The downstream node synchronizes the second secondary receiving slot table based on the second secondary sending slot table.

In a possible implementation, before S501, the method further includes the following step:

S509. The upstream node updates the first secondary sending slot table based on sending slot configuration information. The sending slot configuration information is used to configure the first secondary sending slot table, and after the configuration, the bandwidth indicated by the first secondary sending slot table is less than the bandwidth indicated by the first primary sending slot table.

In a possible implementation, before S501, the method further includes the following step:

S510. The upstream node sends third indication information and the first secondary sending slot table to the intermediate node, and the intermediate node receives the third indication information and the first secondary sending slot table from the upstream node. The intermediate node sends fourth indication information to the upstream node, and the upstream node receives the fourth indication information from the intermediate node.

Specifically, the third indication information is used to request the intermediate node to switch from the currently used first primary receiving slot table to the first secondary receiving slot table, and the fourth indication information is used to indicate that the intermediate node allows switching from the currently used first primary receiving slot table to the first secondary receiving slot table. The third indication information and the fourth indication information may be sent by using a FlexE overhead. The third indication information and the first secondary sending slot table may be sent by using a same FlexE overhead, or may be sent by using different FlexE overheads. This is not limited in the present invention. For description of the FlexE overhead, refer to the example in FIG. 3. Details are not described herein again.

In a possible implementation, after S507, the method further includes the following step:

S511. The intermediate node updates the second secondary sending slot table based on the sending slot configuration information. A bandwidth indicated by the updated second secondary sending slot table is less than the bandwidth indicated by the second primary sending slot table.

In a possible implementation, before S504, the method further includes the following step:

S512. The intermediate node sends fifth indication information and the second secondary sending slot table to the downstream node, and the downstream node receives the fifth indication information and the second secondary sending slot table from the intermediate node. The downstream node sends sixth indication information to the intermediate node, and the intermediate node receives the sixth indication information from the downstream node. The fifth indication information is used to request the downstream node to switch from the currently used second primary receiving slot table to the second secondary receiving slot table. The sixth indication information indicates that the downstream node allows switching from the currently used second primary receiving slot table to the second secondary receiving slot table. Specifically, the fifth indication information and the second secondary sending slot table may be sent by using a FlexE overhead. The fifth indication information and the second secondary sending slot table may be sent by using a same FlexE overhead, or may be sent by using different FlexE overheads. This is not limited in the present invention.

Based on the network architecture of the FlexE communications system in FIG. 1a, the following describes a process of the embodiments of the present invention by using several specific examples.

Embodiment a: A transmission channel is a forward channel, and a flow direction of service data on the transmission channel is: user equipment 4→a source node 1→an intermediate node 2→a destination node 3→user equipment 5→a network management system 6. A current bandwidth of the transmission channel is 10G, and a bandwidth of a user interface 1 and a bandwidth of a user interface 4 each are 100G. Currently, the bandwidth of the transmission channel needs to be increased to 20G. Steps of increasing the bandwidth of the transmission channel are as follows:

Step 1: The network management system 6 generates sending slot configuration information, and sends the sending slot configuration information to the source node 1 and the intermediate node 2 on the transmission channel. Slots currently used by a transmit port of a Flex interface 1 of the source node 1 are a TS1 and a TS2, and the slot configuration information is that slots newly configured for the transmit port of the FlexE interface 1 are the TS1, the TS2, a TS3, and a TS4. Slots currently used by a transmit port of a FlexE interface 3 of the intermediate node 2 are a TS5 and a TS6, and the slot configuration information is that slots newly configured for the transmit port of the FlexE interface 3 are the TS5, the TS6, a TS7, and a TS8.

Step 2: The source node 1 receives the sending slot configuration information from the network management system 6, and checks whether the slots TS1, TS2, TS3, and TS4 indicated by the sending slot configuration information are in an available state. If yes, the source node 1 sends a slot configuration success message to the NMS 6. The intermediate node 2 receives the sending slot configuration information from the network management system 6, and checks whether the slots TS5, TS6, TS7, and TS8 indicated by the sending slot configuration information are in an available state. If yes, the intermediate node 2 sends a slot configuration success message to the network management system 6.

Step 3: After receiving the slot configuration success messages from the source node 1 and the intermediate node 2, the network management system sends a bandwidth increase adjustment instruction to the destination node 3, to trigger the destination node 3 to start to increase the bandwidth of the transmission channel.

Step 4: The destination node 3 sends a bandwidth increase instruction to the intermediate node 2, and the intermediate node 2 receives the bandwidth increase instruction from the destination node 3. For example, the bandwidth increase instruction may be the first indication information in the embodiment in FIG. 2.

Step 5: The bandwidth increase instruction is used to instruct the intermediate node 2 to increase the bandwidth of the transmission channel. After receiving the bandwidth increase instruction from the destination node 3, the intermediate node 2 updates a secondary sending slot table 3 based on the newly configured slots (the TS1, the TS2, the TS3, and the TS4), and the intermediate node 2 sends a slot change request (Change Request, CR) and the secondary sending slot table 3 to the destination node 3. For example, the slot change request may be the fifth indication information in the embodiment in FIG. 2.

Step 6: The destination node 3 receives the slot change request and the secondary sending slot table 3 from the intermediate node 2, and the destination node 3 checks whether the slots (the TS1, the TS2, the TS3, and the TS4) indicated by the secondary sending slot table are in an available state. If yes, the destination node 3 synchronizes a secondary receiving slot table 4 based on the secondary sending slot table 3, so that a slot indicated by the secondary receiving slot table 4 is consistent with a slot indicated by the secondary sending slot table 3. After the synchronization, the destination node 3 sends a slot change acknowledgment (CA, Change Acknowledged) to the intermediate node 2. The slot change acknowledgment indicates that the destination node 3 has prepared to switch from a currently used primary receiving slot table 4 to the secondary receiving slot table 4. The slot change acknowledgment is sent by using a FlexE overhead. For example, the slot change acknowledgment may be the sixth indication information in the embodiment in FIG. 2.

Step 7: The intermediate node 2 receives the FlexE overhead that includes the slot change acknowledgment from the destination node 3. The intermediate node 2 learns that the destination node 3 has prepared to switch from the currently used primary receiving slot table 4 to the secondary receiving slot table 4. The intermediate node 2 sends a calendar switching instruction to the destination node 3. The calendar switching instruction is used to instruct the destination node 3 to switch from the currently used primary receiving slot table 4 to the secondary receiving slot table 4. The calendar switching instruction is represented by a slot table status flag in a FlexE overhead. The intermediate node 2 sends, in a block after the FlexE overhead by using which the calendar switching indication is sent, the service data to the destination node 3 by using the secondary sending slot table 3. For example, the calendar switching instruction may be the second indication information in the embodiment in FIG. 2.

Step 8: The destination node 3 receives the FlexE overhead that includes the slot table status flag from the intermediate node 2, and the destination node 3 finds that a value of the slot table status flag is inverted relative to a previous value, and the destination node 3 switches from the currently used primary receiving slot table 4 to the secondary receiving slot table 4. The destination node 3 receives the service data from the intermediate node 2 by using the secondary receiving slot table 4 in a service block after the overhead.

Step 9: After switching to the secondary sending slot table 3, the intermediate node 2 sends a bandwidth increase instruction to the source node 1. The bandwidth increase instruction is sent by using a FlexE overhead, and the bandwidth increase instruction is used to instruct the source node 1 to increase the bandwidth of the transmission channel. For example, the bandwidth increase instruction may be the third indication information in the embodiment in FIG. 2.

Step 10: The source node 1 receives the bandwidth increase instruction from the intermediate node 2, the source node 1 updates a secondary sending slot table 1 based on the sending slot configuration information (the TS5, the TS6, the TS7, and the TS8) delivered by the network management system, and the source node 1 sends a slot change request and the secondary sending slot table 1 to the intermediate node 2. The slot change request is sent by using a FlexE overhead, and the slot change request is used to request the intermediate node to prepare to switch from a currently used primary receiving slot table 2 to a secondary receiving slot table 2. For example, the slot change request may be the seventh indication information in the embodiment in FIG. 2.

Step 11: The intermediate node 2 receives the slot change request and the secondary sending slot table 1 from the source node 1, and the intermediate node 2 checks whether the slots TS5, TS6, TS7, and TS8 indicated by the secondary sending slot table 1 are in an available state. If yes, the intermediate node 2 synchronizes the secondary receiving slot table 2 based on the secondary sending slot table 1, so that a slot configuration in the secondary receiving slot table 2 is consistent with a slot in the secondary sending slot table 1. After the synchronization, the intermediate node 2 sends a slot change acknowledgment to the source node 1. The slot change acknowledgment indicates that the intermediate node 2 has prepared to switch from the primary receiving slot table 2 to the secondary receiving slot table 2. For example, the slot change acknowledgment may be the eighth indication information in the embodiment in FIG. 2.

Step 12: The source node 1 receives the slot change acknowledgment from the intermediate node 2, and learns that the intermediate node 2 has prepared to switch from the current primary receiving slot table 2 to the secondary receiving slot table 2, and the source node 1 switches from the currently used primary sending slot table 1 to the secondary sending slot table 1. The source node 1 sends a FlexE overhead including a slot table status flag to the intermediate node 2. For example, the slot table status flag may be the fourth indication information in the embodiment in FIG. 2. The source node 1 sends, in a service block after the overhead, the service data to the intermediate node 2 by using the secondary sending slot table 1, and then the source node 1 sends a bandwidth increase success message to the network management system 6, to indicate that the bandwidth of the transmission channel is successfully increased to 20G.

Step 13: The intermediate node 2 receives the FlexE overhead including the slot table status flag from the source node 1, and the intermediate node 2 determines that a value of the slot table status flag in the overhead is inverted relative to a previous value. The intermediate node 2 switches from the currently used primary receiving slot table 2 to the secondary receiving slot table 2. The intermediate node 2 receives, in a service block (a 66B block) after the overhead, the service data from the source node by using the secondary receiving slot table 2.

Embodiment b: A bandwidth of a transmission channel needs to be decreased from 10G to 5G, and steps of decreasing the bandwidth of the transmission channel are as follows:

Step 1: A network management system 6 generates sending slot configuration information. Slots currently configured for a transmit port of a FlexE interface 1 of a source node 1 are a TS1 and a TS2, and the sending slot configuration information is that a sending slot newly configured for the transmit port of the FlexE interface is the TS1. Slots currently configured for a transmit port of a FlexE interface 3 of the intermediate node 2 are a TS5 and a TS6, and the slot configuration information is that a sending slot newly configured for the transmit port of the FlexE interface 3 is the TS5. The network management system sends the slot configuration information to the source node 1 and the intermediate node 2.

Step 2: The source node 1 receives the sending slot configuration information (TS1) from the network management system 6, and checks whether the slot TS1 is in an available state. If yes, the source node 1 sends a slot configuration success message to the network management system 6, and the source node 1 stores the sending slot configuration information. The intermediate node 2 receives the sending slot configuration information (TS5) from the network management system 6, and the intermediate node 2 checks whether the slot TS5 is in an available state. If yes, the intermediate node 2 sends a slot configuration success message to the network management system 6, and the intermediate node 2 stores the sending slot configuration information.

Step 3: The network management system 6 receives the slot configuration success messages from the source node 1 and the intermediate node 2, and delivers an instruction to the source node 1, to trigger the source node 1 to start an action of decreasing the bandwidth of the transmission channel.

Step 4: The source node 1 receives the instruction from the network management system 6, and updates a secondary sending slot table 1 based on the sending slot configuration information (TS1) from the network management system 6, and the source node 1 sends a slot change request and the secondary sending slot table 1 to the intermediate node 2. The slot change request is used to request the intermediate node 2 to prepare to switch from a currently used primary receiving slot table 2 to a secondary receiving slot table 2. The slot change request may be the fifth indication information in the embodiment in FIG. 3.

Step 5: The intermediate node 2 receives the slot change request and the secondary sending slot table 1 from the source node, and the intermediate node 2 checks whether the slot TS1 indicated by the secondary sending slot table 1 is in an available state. If yes, the intermediate node 2 synchronizes the secondary receiving slot table 2 based on the secondary sending slot table 1, so that a slot configuration of the secondary receiving slot table 2 is consistent with a slot of the secondary sending slot table 1. After the synchronization, the intermediate node 2 sends a slot change acknowledgment to the source node 1. The slot change acknowledgment indicates that the intermediate node 2 has prepared to switch from the current primary receiving slot table 2 to the secondary receiving slot table 2. The slot change acknowledgment may be the sixth indication information in the embodiment in FIG. 3.

Step 6: After receiving the slot change acknowledgment from the intermediate node 2, the source node 1 sends a FlexE overhead including a slot table status flag to the intermediate node 2. The slot status flag may be the first indication information in the embodiment in FIG. 3. Then, the source node 1 switches a current primary sending slot table 1 to the secondary sending slot table 1, and the source node 1 sends, in a service block after the overhead, service data to the intermediate node 2 by using the secondary sending slot table 1. After switching to the secondary sending slot table 1, the source node sends a bandwidth decrease instruction to the intermediate node 2 by using a FlexE overhead. The bandwidth decrease instruction is used to instruct the intermediate node 2 to decrease the bandwidth of the transmission channel. The bandwidth decrease instruction may be the second indication information in the embodiment in FIG. 3.

Step 7: The intermediate node 2 receives the FlexE overhead including the slot table status flag from the source node 1, and the intermediate node 2 determines that a value of the slot table status flag in the overhead is inverted relative to a previous value. The intermediate node 2 switches from the current primary receiving slot table 2 to the secondary receiving slot table 2. The intermediate node 2 receives, in a service block after the overhead, the service data from the source node by using the secondary receiving slot table 2.

Step 8: The intermediate node 2 receives the bandwidth decrease instruction from the source node 1, updates a secondary sending slot table 3 based on the sending slot configuration information (TS5) from the network management system, and sends a slot change request and the secondary sending slot table 3 to a destination node 3. The slot change request is used to request the destination node 3 to switch from a current primary receiving slot table 4 to a secondary receiving slot table 4. The slot change request may be the seventh indication information in the embodiment in FIG. 3.

Step 9: The destination node 3 receives the slot change request and the secondary sending slot table 3 from the intermediate node 2, and the destination node 3 checks whether the slot TS5 indicated by the secondary sending slot table 3 is in an available state. If yes, the destination node 3 synchronizes the secondary receiving slot table 4 based on the secondary sending slot table 3, so that a slot configuration of the secondary receiving slot table 4 is consistent with a slot configuration of the secondary sending slot table 3. After the synchronization, the destination node 3 sends a slot change acknowledgment to the intermediate node 2. The slot change acknowledgment indicates that the destination node 3 has prepared to switch from the currently used primary receiving slot table 4 to the secondary receiving slot table 4. The slot change acknowledgment may be the eighth indication information in the embodiment in FIG. 3.

Step 10: After the intermediate node 2 receives the slot change acknowledgment from the destination node 3, the intermediate node 2 sends, to the destination node 3, a FlexE overhead including a slot table status flag. The slot table status flag may be the third indication information in the embodiment in FIG. 3. Then, the intermediate node 2 switches a currently used primary sending slot table 3 to the secondary sending slot table 3, and the intermediate node 2 sends the service data to the destination node 3 by using the secondary sending slot table 3 after the overhead. After switching to the secondary sending slot table 3, the intermediate node 2 sends a bandwidth decrease instruction to the destination node 3.

Step 11: The destination node 3 receives, from the intermediate node 2, the FlexE overhead that includes the slot table status flag, and the destination node 3 finds that a value of the slot table status flag is inverted relative to a previous value, and the destination node 3 switches from the currently used primary receiving slot table 4 to the secondary receiving slot table 4. The destination node 3 receives the service data from the intermediate node 2 by using the secondary receiving slot table 4 after the overhead.

Step 12: After receiving the bandwidth decrease instruction from the intermediate node 2, the destination node 3 sends a bandwidth decrease success indication to the network management system 6 when the destination node 3 determines that the destination node 3 is a destination node, to indicate that the bandwidth of the transmission channel is successfully decreased. The bandwidth decrease instruction may be the fourth indication information in the embodiment in FIG. 3.

Embodiment c: Currently, a bandwidth of a transmission channel needs to be increased from 10G to 20G, a bandwidth from a FlexE interface 1 to a FlexE interface 4 is 100G, and a bandwidth of a user interface is 50G. Steps of increasing the bandwidth of the transmission channel are as follows:

Step 1: A network management system 6 generates sending slot configuration information, and sends the sending slot configuration information to a source node 1 and an intermediate node 2 on the transmission channel. Slots currently used by a transmit port of a Flex interface 1 of the source node 1 are a TS1 and a TS2, and the slot configuration information is that slots newly configured for the transmit port of the FlexE interface 1 are the TS1, the TS2, a TS3, and a TS4. Slots currently used by a transmit port of a FlexE interface 3 of the intermediate node 2 are a TS5 and a TS6, and the slot configuration information is that slots newly configured for the transmit port of the FlexE interface 3 are the TS5, the TS6, a TS7, and a TS8.

Step 2: The source node 1 receives the sending slot configuration information from the network management system 6, and checks whether the slots TS1, TS2, TS3, and TS4 indicated by the sending slot configuration information are in an available state. If yes, the source node 1 sends a slot configuration success message to the NMS 6. The intermediate node 2 receives the sending slot configuration information from the network management system 6, and checks whether the slots TS5, TS6, TS7, and TS8 indicated by the sending slot configuration information are in an available state. If yes, the intermediate node 2 sends a slot configuration success message to the network management system 6.

Step 3: After receiving the slot configuration success messages from the source node 1 and the intermediate node 2, the network management system 6 sends a bandwidth increase adjustment instruction to a source node 1, to trigger the source node 1 to start to increase the bandwidth of the transmission channel.

Step 4: The source node 1 receives the instruction from the network management system 6, the source node 1 updates a secondary sending slot table 1 based on the sending slot configuration information (the TS1, the TS2, the TS3, and the TS4), and the source node 1 transmits a slot change request and the secondary sending slot table 1 to the intermediate node 2. The slot change request is used to request the intermediate node 2 to prepare to switch from a currently used primary receiving slot table 2 to a secondary receiving slot table 2. For example, the slot change request may be the third indication information in the embodiment in FIG. 5.

Step 5: The intermediate node 2 synchronizes the secondary receiving slot table 2 based on the secondary sending slot table 1, so that a receiving slot of the secondary receiving slot table 2 is consistent with a sending slot of the secondary sending slot table 1. The intermediate node 2 updates a secondary sending slot table 3 based on the sending slot configuration information (the TS5, the TS6, the TS7, and the TS8), and the intermediate node 2 sends a slot change request and the secondary sending slot table 3 to a destination node 3. The slot change request is used to request the destination node 3 to prepare to switch from a currently used primary receiving slot table 4 to a secondary receiving slot table 4. For example, the slot change request may be the fifth indication information in the embodiment in FIG. 5.

Step 6: The destination node 3 synchronizes the secondary receiving slot table 4 based on the secondary sending slot table 3, so that a receiving slot indicated by the secondary receiving slot table 4 is consistent with a sending slot indicated by the secondary sending slot table 3. The destination node 3 sends a slot change acknowledgment to the intermediate node 2. The slot change acknowledgment indicates that the destination node 3 has prepared to switch from the currently used primary receiving slot table 4 to the secondary receiving slot table 4. For example, the slot change acknowledgment may be the sixth indication information in the embodiment in FIG. 5.

Step 7: The intermediate node 2 sends a calendar switching instruction to the destination node 3, and the calendar switching instruction may be indicated by a slot table status flag in an overhead. The calendar switching instruction may be the first indication information in the embodiment in FIG. 5. The intermediate node 2 switches a currently used primary sending slot table 3 to the secondary sending slot table 3.

Step 8: After receiving the calendar switching instruction, the destination node 3 switches from the currently used primary receiving slot table 4 to the secondary receiving slot table 4 based on the calendar switching instruction, and the destination node 3 receives service data from the intermediate node 2 by using the slot indicated by the secondary receiving slot table 4.

Step 9: The intermediate node 2 sends a slot change acknowledgment to the source node 1. The slot change acknowledgment indicates that the intermediate node 2 has prepared to switch from the current primary receiving slot table 2 to the secondary receiving slot table 2. In this case, the intermediate node 2 has not switched to the secondary receiving slot table 2, and the intermediate node 2 still receives the service data from the source node 1 by using a slot indicated by the primary receiving slot table 2. The slot change acknowledgment may be the fourth indication information in the embodiment in FIG. 5.

Step 10: The source node 1 sends a calendar switching instruction to the intermediate node 2. The calendar switching instruction is used to instruct the intermediate node to switch from the currently used primary receiving slot table 2 to the secondary receiving slot table 2. Then, the source node 1 switches a currently used primary sending slot table 1 to a secondary sending slot table 1. After receiving the calendar switching instruction from the upstream node 1, the intermediate node 2 switches from the currently used primary receiving slot table 2 to the secondary receiving slot table 2. The calendar switching instruction may be the second indication information in FIG. 5.

FIG. 3 to FIG. 5 describe in detail the method for adjusting a bandwidth of a transmission channel in flexible Ethernet according to an embodiment of the present invention. The following provides an apparatus (an apparatus 600 for short below) for adjusting a bandwidth of a transmission channel in flexible Ethernet according to an embodiment of the present invention. The apparatus 600 includes a transceiver unit 601 and a processing unit 602.

There are an upstream node, the apparatus, and a downstream node on a path of the transmission channel, a flow direction of service data on the transmission channel is: the upstream node→the apparatus 600→the downstream node, the apparatus 600 is located between the upstream node and the downstream node, and the apparatus 600 is adjacent to each of the upstream node and the downstream node. The upstream node includes a first FlexE interface, the apparatus 600 includes a second FlexE interface and a third FlexE interface, and the downstream node includes a fourth FlexE interface. The upstream node is connected to the apparatus 600 through the first FlexE interface and the second FlexE interface, and the apparatus 600 is connected to the downstream node through the third FlexE interface and the fourth FlexE interface. The first FlexE interface includes a first transmit port and a first receive port, the second Flex interface includes a second transmit port and a second receive port, the third FlexE interface includes a third transmit port and a third receive port, and the fourth FlexE interface includes a fourth transmit port and a fourth receive port. The first transmit port is bound to a first primary sending slot table and a first secondary sending slot table, the second receive port is bound to a first primary receiving slot table and a first secondary receiving slot table, the third transmit port is bound to a second primary sending slot table and a second secondary sending slot table, and the fourth receive port is bound to a second primary receiving slot table and a second secondary receiving slot table.

Figure 6:
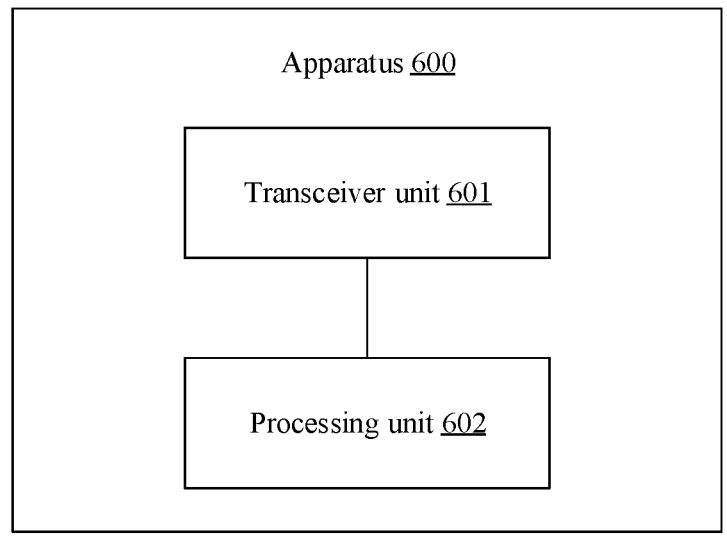
FIG. 6 is a schematic structural diagram of an apparatus according to an embodiment of the present invention.

1. In a possible implementation, the apparatus 600 shown in FIG. 6 may implement the intermediate node in the embodiment shown in FIG. 2.

The transceiver unit 601 is configured to receive first indication information from the downstream node, where the first indication information is used to instruct the apparatus to increase the bandwidth of the transmission channel. For a specific process of the transceiver unit 601 herein, refer to the description in S201 in FIG. 2.

The transceiver unit 601 is further configured to send second indication information to the downstream node, where the second indication information is used to instruct the downstream node to switch from the currently used second primary receiving slot table to the second secondary receiving slot table. For a specific process of the transceiver unit 601 herein, refer to the description in S202 in FIG. 2.

The processing unit 602 is configured to: after the transceiver unit 601 sends the second indication information, switch from the currently used second primary sending slot table to the second secondary sending slot table. For a specific process, refer to the description in S203 in FIG. 2.

The transceiver unit 601 is further configured to: after the processor switches to the second secondary sending slot table, send third indication information to the upstream node, where the third indication information is used to instruct the upstream node to increase the bandwidth of the transmission channel. For a specific process, refer to the description in S205 in FIG. 2.

The transceiver unit 601 is further configured to receive fourth indication information from the upstream node, where the fourth indication information is used to instruct the apparatus to switch from the currently used first primary receiving slot table to the first secondary receiving slot table. For a specific process, refer to the description in S206.

The processing unit 602 is further configured to switch from the first primary receiving slot table to the first secondary receiving slot table according to the fourth indication information. For a specific process, refer to the description in S208.

The transceiver unit 601 is further configured to send fifth indication information and the second secondary sending slot table to the downstream node, where the fifth indication information is used to request the downstream node to switch from the currently used second primary receiving slot table to the second secondary receiving slot table.

The transceiver unit 601 is further configured to receive sixth indication information from the downstream node, where the sixth indication information is used to indicate that the downstream node allows switching from the currently used second primary receiving slot table to the second secondary receiving slot table. For a specific process, refer to the description in S211.

The processing unit 602 is further configured to synchronize the first secondary receiving slot table based on the first secondary sending slot table, so that a receiving slot of the first secondary receiving slot table is consistent with a slot of the first secondary sending slot table. For details, refer to the description in S210.

The transceiver unit 601 is further configured to receive seventh indication information and the first secondary sending slot table from the upstream node, where the seventh indication information is used to request the apparatus to switch from the currently used first primary receiving slot table to the first secondary receiving slot table. For a specific process, refer to the description in S212.

The transceiver unit 601 is further configured to:

send eighth indication information to the upstream node, where the eighth indication information is used to indicate that the apparatus allows switching from the currently used first primary receiving slot table to the first secondary receiving slot table. For a specific process, refer to the description in S213.

The processing unit 602 is further configured to determine, by the apparatus, that the slot indicated by the first secondary sending slot table is in an available state.

The first indication information and the third indication information each are carried in a FlexE overhead. For a specific process, refer to the description in S214.

A FlexE overhead used to carry the first indication information further includes an identifier of the transmission channel, or a FlexE overhead used to carry the third indication information further includes an identifier of the transmission channel.

The transceiver unit 601 is further configured to receive, by an intermediate node, sending slot configuration information from a network management system.

The processing unit 602 is further configured to obtain the second secondary sending slot table based on the sending slot configuration information, where the bandwidth indicated by the configured second secondary sending slot table is greater than the bandwidth indicated by the second primary sending slot table. For a specific process, refer to the description in S215.

2. In a possible implementation, the apparatus 600 shown in FIG. 6 may implement the intermediate node in the embodiments shown in FIG. 3 and FIG. 5. In this embodiment, a bandwidth indicated by the first primary sending slot table is greater than a bandwidth indicated by the first secondary sending slot table, a bandwidth indicated by the first primary receiving slot table is greater than a bandwidth indicated by the first secondary receiving slot table, a bandwidth indicated by the second primary sending slot table is greater than a bandwidth indicated by the second secondary sending slot table, and a bandwidth indicated by the second primary receiving slot table is greater than a bandwidth indicated by the second secondary receiving slot table.

The transceiver unit 601 is configured to receive first indication information from the upstream node, where the first indication information is used to instruct the apparatus to switch from the currently used first primary receiving slot table to the first secondary receiving slot table. For a specific process, refer to the description in S301.

The processing unit 602 is further configured to switch from the first primary receiving slot table to the first secondary receiving slot table according to the first indication information. For a specific process, refer to the description in S303.

The transceiver unit 601 is configured to send third indication information to the downstream node, where the third indication information is used to instruct the downstream node to switch from the currently used second primary receiving slot table to the second secondary receiving slot table. For a specific process, refer to the description in S305.

The processing unit 602 is further configured to: after the third indication information is sent, switch from the currently used second primary sending slot table to the second secondary sending slot table. For a specific process, refer to the description in S306.

The transceiver unit 601 is further configured to receive second indication information from the upstream node, where the second indication information is used to instruct the apparatus to decrease the bandwidth of the transmission channel. For a specific process, refer to the description in S304.

The transceiver unit 601 is further configured to send fourth indication information to the downstream node, where the fourth indication information is used to instruct the downstream node to decrease the bandwidth of the transmission channel. For a specific process, refer to the description in S308.

The processing unit 602 is configured to synchronize the first secondary receiving slot table based on the first secondary sending slot table, so that a slot indicated by the first secondary receiving slot table is consistent with a slot indicated by the first secondary sending slot table. For a specific process, refer to the description in S309.

The transceiver unit 601 is further configured to receive fifth indication information and the first secondary sending slot table from the upstream node, where the fifth indication information is used to request the apparatus to switch from the currently used first primary receiving slot table to the first secondary receiving slot table. For a specific process, refer to the description in S311.

The transceiver unit 601 is further configured to send sixth indication information to the upstream node, where the sixth indication information is used to indicate that the apparatus allows switching from the currently used first primary receiving slot table to the first secondary receiving slot table. For a specific process, refer to the description in S312.

The transceiver unit 601 is further configured to send seventh indication information and the second secondary sending slot table to the downstream node, where the seventh indication information is used to request the downstream node to switch from the currently used second primary receiving slot table to the second secondary receiving slot table.

The transceiver unit 601 is further configured to receive eighth indication information from the downstream node, where the eighth indication information is used to indicate that the downstream node allows switching from the currently used second primary receiving slot table to the second secondary receiving slot table. For a specific process, refer to the description in S313.

The first indication information and the third indication information are sent by using a FlexE overhead.

A FlexE overhead used to send the first indication information further includes an identifier of the transmission channel, and a FlexE overhead used to send the third indication information further includes the identifier of the transmission channel.

The transceiver unit 601 is further configured to receive sending slot configuration information from a network management system.

The processing unit 602 is further configured to obtain the second secondary sending slot table based on the sending slot configuration information, where the bandwidth indicated by the configured second secondary sending slot table is less than the bandwidth indicated by the second primary sending slot table. For a specific process, refer to the description in S314.

3. In a possible implementation, the apparatus 600 shown in FIG. 6 may implement the intermediate node in the embodiment shown in FIG. 4. A bandwidth indicated by the first primary sending slot table is less than a bandwidth indicated by the first secondary sending slot table, a bandwidth indicated by the first primary receiving slot table is less than a bandwidth indicated by the first secondary receiving slot table, a bandwidth indicated by the second primary sending slot table is less than a bandwidth indicated by the second secondary sending slot table, and a bandwidth indicated by the second primary receiving slot table is less than a bandwidth indicated by the second secondary receiving slot table.

The transceiver unit 601 is configured to send first indication information to the downstream node, where the first indication information is used to instruct the downstream node to switch from the currently used second primary receiving slot table to the second secondary receiving slot table. For a specific process, refer to the description in S401.

The processing unit 602 is further configured to: after the transceiver sends the first indication information, switch from the currently used second primary sending slot table to the second secondary sending slot table. For a specific process, refer to the description in S402.

The transceiver unit 601 is further configured to receive second indication information from the upstream node, where the second indication information is used to instruct the apparatus to switch from the currently used first primary receiving slot table to the first secondary receiving slot table. For a specific process, refer to the description in S404.

The processing unit 602 is further configured to switch from the first primary receiving slot table to the first secondary receiving slot table according to the second indication information. For a specific process, refer to the description in S406.

The processing unit 602 is configured to synchronize the first secondary receiving slot table based on the first secondary sending slot table, so that a slot indicated by the first secondary receiving slot table is consistent with a slot indicated by the first secondary sending slot table. For a specific process, refer to the description in S408.

The transceiver unit 601 is further configured to receive third indication information and the first secondary sending slot table from the upstream node, where the third indication information is used to request the apparatus to switch from the currently used first primary receiving slot table to the first secondary receiving slot table.

The transceiver unit 601 is further configured to send fourth indication information to the upstream node, where the fourth indication information is used to indicate that the apparatus allows switching from the currently used first primary receiving slot table to the first secondary receiving slot table. For a specific process, refer to the description in S410.

The transceiver unit 601 is further configured to send fifth indication information and the second secondary sending slot table to the downstream node, where the fifth indication information is used to request the downstream node to switch from the currently used second primary receiving slot table to the second secondary receiving slot table.

The transceiver unit 601 is further configured to receive sixth indication information from the downstream node, where the sixth indication information is used to indicate that the downstream node allows switching from the currently used second primary receiving slot table to the second secondary receiving slot table. For a specific process, refer to the description in S413.

The transceiver unit 601 is further configured to receive sending slot configuration information from a network management system. The sending slot configuration information is used to configure the second secondary sending slot table, and the bandwidth indicated by the configured second secondary sending slot table is greater than that of the second primary sending slot table currently used by the apparatus. For a specific process, refer to the description in S409.

The apparatus 600 may be an intermediate node, and the apparatus 600 is configured to perform the method in the embodiments in FIG. 2 to FIG. 4. Alternatively, the apparatus 600 may be a field-programmable gate array (field-programmable gate array, FPGA), an application-specific integrated circuit chip, a system on chip (system on chip, SoC), a central processing unit (central processor unit, CPU), a network processor (network processor, NP), a digital signal processing circuit, or a micro controller unit (micro controller unit, MCU) that implements a related function, or may be a programmable logic device (programmable logic device, PLD) or another integrated chip.

Figure 7:
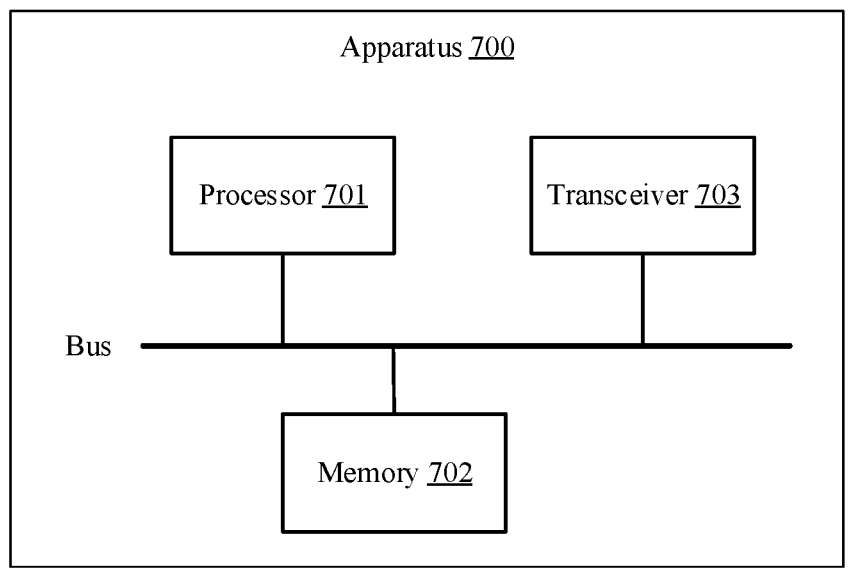
FIG. 7 is another schematic structural diagram of an apparatus according to an embodiment of the present invention.

FIG. 7 is a schematic structural diagram of an apparatus according to an embodiment of the present invention. The apparatus is referred to as an apparatus 700 below. The apparatus 700 may be an upstream node, an intermediate node, or a downstream node. When the apparatus 700 is an intermediate node, the apparatus 700 performs the method performed by the intermediate node corresponding to the embodiments in FIG. 2 to FIG. 5. As shown in FIG. 7, the apparatus includes a memory 702, a processor 701, and a transceiver 703.

The memory 702 may be an independent physical unit, and may be connected to the processor 701 and the transceiver 703 by using a bus. The memory 702, the processor 701, and the transceiver 703 may alternatively be integrated together, and implemented by using hardware. The transceiver 703 may include an independent transmitter and an independent receiver. The memory 702 stores a segment of program code, and the processor 701 invokes the program code to perform a corresponding operation.

There are an upstream node, the apparatus, and a downstream node on a path of the transmission channel, a flow direction of service data on the transmission channel is: the upstream node→the apparatus 700→the downstream node, the apparatus 700 is located between the upstream node and the downstream node, and the apparatus 700 is adjacent to each of the upstream node and the downstream node. The upstream node includes a first FlexE interface, the apparatus 700 includes a second FlexE interface and a third FlexE interface, and the downstream node includes a fourth FlexE interface. The upstream node is connected to the apparatus 700 through the first FlexE interface and the second FlexE interface, and the apparatus 700 is connected to the downstream node through the third FlexE interface and the fourth FlexE interface. The first FlexE interface includes a first transmit port and a first receive port, the second Flex interface includes a second transmit port and a second receive port, the third FlexE interface includes a third transmit port and a third receive port, and the fourth FlexE interface includes a fourth transmit port and a fourth receive port. The first transmit port is bound to a first primary sending slot table and a first secondary sending slot table, the second receive port is bound to a first primary receiving slot table and a first secondary receiving slot table, the third transmit port is bound to a second primary sending slot table and a second secondary sending slot table, and the fourth receive port is bound to a second primary receiving slot table and a second secondary receiving slot table.

1. In a possible implementation, the apparatus 700 shown in FIG. 7 may implement the intermediate node in the embodiment shown in FIG. 2.

The transceiver 703 is configured to receive first indication information from the downstream node, where the first indication information is used to instruct the apparatus to increase the bandwidth of the transmission channel. For a specific process of the transceiver 703 herein, refer to the description in S201 in FIG. 2.

The transceiver 703 is further configured to send second indication information to the downstream node, where the second indication information is used to instruct the downstream node to switch from the currently used second primary receiving slot table to the second secondary receiving slot table. For a specific process of the transceiver 703 herein, refer to the description in S203 in FIG. 2.

The processor 701 is configured to: after the transceiver 703 sends the second indication information, switch from the currently used second primary sending slot table to the second secondary sending slot table. For a specific process, refer to the description in S204 in FIG. 2.

The transceiver 703 is further configured to: after the processor switches to the second secondary sending slot table, send third indication information to the upstream node, where the third indication information is used to instruct the upstream node to increase the bandwidth of the transmission channel. For a specific process, refer to the description in S205 in FIG. 2.

The transceiver 703 is further configured to receive fourth indication information from the upstream node, where the fourth indication information is used to instruct the apparatus to switch from the currently used first primary receiving slot table to the first secondary receiving slot table. For a specific process, refer to the description in S206.

The processor 701 is further configured to switch from the first primary receiving slot table to the first secondary receiving slot table according to the fourth indication information. For a specific process, refer to the description in S208.

The transceiver 703 is further configured to send fifth indication information and the second secondary sending slot table to the downstream node, where the fifth indication information is used to request the downstream node to switch from the currently used second primary receiving slot table to the second secondary receiving slot table.

The transceiver 703 is further configured to receive sixth indication information from the downstream node, where the sixth indication information is used to indicate that the downstream node allows switching from the currently used second primary receiving slot table to the second secondary receiving slot table. For a specific process, refer to the description in S211.

The processor 701 is further configured to synchronize the first secondary receiving slot table based on the first secondary sending slot table, so that a receiving slot of the first secondary receiving slot table is consistent with a slot of the first secondary sending slot table. For details, refer to the description in S210.

The transceiver 703 is further configured to receive seventh indication information and the first secondary sending slot table from the upstream node, where the seventh indication information is used to request the apparatus to switch from the currently used first primary receiving slot table to the first secondary receiving slot table. For a specific process, refer to the description in S212.

The transceiver 703 is further configured to:

send eighth indication information to the upstream node, where the eighth indication information is used to indicate that the apparatus allows switching from the currently used first primary receiving slot table to the first secondary receiving slot table. For a specific process, refer to the description in S213.

The processor 701 is further configured to determine, by the apparatus, that the slot indicated by the first secondary sending slot table is in an available state.

The first indication information and the third indication information each are carried in a FlexE overhead. For a specific process, refer to the description in S214.

A FlexE overhead used to carry the first indication information further includes an identifier of the transmission channel, or a FlexE overhead used to carry the third indication information further includes an identifier of the transmission channel.

The transceiver 703 is further configured to receive, by an intermediate node, sending slot configuration information from a network management system.

The processor 701 is further configured to obtain the second secondary sending slot table based on the sending slot configuration information, where the bandwidth indicated by the configured second secondary sending slot table is greater than the bandwidth indicated by the second primary sending slot table. For a specific process, refer to the description in S215.

2. In a possible implementation, the apparatus 700 shown in FIG. 7 may implement the intermediate node in the embodiments shown in FIG. 3 and FIG. 5. In this embodiment, a bandwidth indicated by the first primary sending slot table is greater than a bandwidth indicated by the first secondary sending slot table, a bandwidth indicated by the first primary receiving slot table is greater than a bandwidth indicated by the first secondary receiving slot table, a bandwidth indicated by the second primary sending slot table is greater than a bandwidth indicated by the second secondary sending slot table, and a bandwidth indicated by the second primary receiving slot table is greater than a bandwidth indicated by the second secondary receiving slot table.

The transceiver 703 is configured to receive first indication information from the upstream node, where the first indication information is used to instruct the apparatus to switch from the currently used first primary receiving slot table to the first secondary receiving slot table. For a specific process, refer to the description in S302. For a specific process, refer to the description in S301.

The processor 701 is further configured to switch from the first primary receiving slot table to the first secondary receiving slot table according to the first indication information. For a specific process, refer to the description in S303.

The transceiver 703 is configured to send third indication information to the downstream node, where the third indication information is used to instruct the downstream node to switch from the currently used second primary receiving slot table to the second secondary receiving slot table. For a specific process, refer to the description in S305.

The processor 701 is further configured to: after the third indication information is sent, switch from the currently used second primary sending slot table to the second secondary sending slot table. For a specific process, refer to the description in S306.

The transceiver 703 is further configured to receive second indication information from the upstream node, where the second indication information is used to instruct the apparatus to decrease the bandwidth of the transmission channel. For a specific process, refer to the description in S304.

The transceiver 703 is further configured to send fourth indication information to the downstream node, where the fourth indication information is used to instruct the downstream node to decrease the bandwidth of the transmission channel. For a specific process, refer to the description in S308.

The processor 701 is configured to synchronize the first secondary receiving slot table based on the first secondary sending slot table, so that a slot indicated by the first secondary receiving slot table is consistent with a slot indicated by the first secondary sending slot table. For a specific process, refer to the description in S309.

The transceiver 703 is further configured to receive the first secondary sending slot table and fifth indication information from the upstream node, where the fifth indication information is used to request the apparatus to switch from the currently used first primary receiving slot table to the first secondary receiving slot table. For a specific process, refer to the description in S311.

The transceiver 703 is further configured to send sixth indication information to the upstream node, where the sixth indication information is used to indicate that the apparatus allows switching from the currently used first primary receiving slot table to the first secondary receiving slot table. For a specific process, refer to the description in S312.

The transceiver 703 is further configured to send seventh indication information and the second secondary sending slot table to the downstream node, where the seventh indication information is used to request the downstream node to switch from the currently used second primary receiving slot table to the second secondary receiving slot table.

The transceiver 703 is further configured to receive eighth indication information from the downstream node, where the eighth indication information is used to indicate that the downstream node allows switching from the currently used second primary receiving slot table to the second secondary receiving slot table. For a specific process, refer to the description in S313.

The first indication information and the third indication information are sent by using a FlexE overhead.

A FlexE overhead used to send the first indication information further includes an identifier of the transmission channel, and a FlexE overhead used to send the third indication information further includes the identifier of the transmission channel.

The transceiver 703 is further configured to receive sending slot configuration information from a network management system.

The processor 701 is further configured to obtain the second secondary sending slot table based on the sending slot configuration information, where the bandwidth indicated by the configured second secondary sending slot table is less than the bandwidth indicated by the second primary sending slot table. For a specific process, refer to the description in S314.

3. In a possible implementation, the apparatus 700 shown in FIG. 7 may implement the intermediate node in the embodiment shown in FIG. 4. A bandwidth indicated by the first primary sending slot table is less than a bandwidth indicated by the first secondary sending slot table, a bandwidth indicated by the first primary receiving slot table is less than a bandwidth indicated by the first secondary receiving slot table, a bandwidth indicated by the second primary sending slot table is less than a bandwidth indicated by the second secondary sending slot table, and a bandwidth indicated by the second primary receiving slot table is less than a bandwidth indicated by the second secondary receiving slot table.

The transceiver 703 is configured to send first indication information to the downstream node, where the first indication information is used to instruct the downstream node to switch from the currently used second primary receiving slot table to the second secondary receiving slot table. For a specific process, refer to the description in S401.

The processor 701 is further configured to: after the transceiver sends the first indication information, switch from the currently used second primary sending slot table to the second secondary sending slot table. For a specific process, refer to the description in S402.

The transceiver 703 is further configured to receive second indication information from the upstream node, where the second indication information is used to instruct the apparatus to switch from the currently used first primary receiving slot table to the first secondary receiving slot table. For a specific process, refer to the description in S404.

The processor 701 is further configured to switch from the first primary receiving slot table to the first secondary receiving slot table according to the second indication information. For a specific process, refer to the description in S406.

The processor 701 is configured to synchronize the first secondary receiving slot table based on the first secondary sending slot table, so that a slot indicated by the first secondary receiving slot table is consistent with a slot indicated by the first secondary sending slot table. For a specific process, refer to the description in S401.

The transceiver 703 is further configured to receive third indication information and the first secondary sending slot table from the upstream node, where the third indication information is used to request the apparatus to switch from the currently used first primary receiving slot table to the first secondary receiving slot table.

The transceiver 703 is further configured to send fourth indication information to the upstream node, where the fourth indication information is used to indicate that the apparatus allows switching from the currently used first primary receiving slot table to the first secondary receiving slot table. For a specific process, refer to the description in S410.

The transceiver 703 is further configured to send fifth indication information and the second secondary sending slot table to the downstream node, where the fifth indication information is used to request the downstream node to switch from the currently used second primary receiving slot table to the second secondary receiving slot table.

The transceiver 703 is further configured to receive sixth indication information from the downstream node, where the sixth indication information is used to indicate that the downstream node allows switching from the currently used second primary receiving slot table to the second secondary receiving slot table. For a specific process, refer to the description in S413.

The transceiver 703 is further configured to receive sending slot configuration information from a network management system. The sending slot configuration information is used to configure the second secondary sending slot table, and the bandwidth indicated by the configured second secondary sending slot table is greater than that of the second primary sending slot table currently used by the apparatus. For a specific process, refer to the description in S409.

This embodiment further provides a FlexE communications system. The FlexE communications system includes an upstream node, an intermediate node, and a downstream node. The intermediate node may be the apparatus 700, or may be a field-programmable gate array (FPGA), an application-specific integrated circuit chip, a system on chip (SoC), a central processing unit (CPU), a network processor (network processor, NP), a digital signal processing circuit, or a micro controller unit (MCU) that implements a related function, or may be a programmable logic device (PLD) or another integrated chip. The intermediate node is configured to perform the methods in the embodiments in FIG. 2 to FIG. 5.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The foregoing storage medium may include a magnetic disk, an optical disc, a read-only memory (ROM), or a random access memory (RAM).

What is disclosed above is merely example embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. An intermediate node for adjusting a bandwidth of a transmission channel in flexible Ethernet (flexE), wherein the intermediate node communicates with an upstream node and a downstream node via FlexE interfaces respectively, the intermediate node is located between the upstream node and the downstream node, and adjacent to the upstream node and the downstream node, the intermediate node comprises:
    a memory comprising instructions;
    a processor coupled to the memory, the instructions implemented by the processor cause the intermediate node to:
    send second indication information to the downstream node to instruct the downstream node to switch from a second primary receiving slot table to the second secondary receiving slot table, wherein a bandwidth indicated by the second secondary receiving slot table is greater than a bandwidth indicated by the second primary receiving slot table;
    after sending the second indication information, switch from a second primary sending slot table to the second secondary sending slot table, wherein a bandwidth indicated by the second secondary sending slot table is greater than a bandwidth indicated by the second primary sending slot table;
    after switching to the second secondary sending slot table, receive fourth indication information from the upstream node, wherein the fourth indication information is used to instruct the intermediate node to switch from a first primary receiving slot table to a first secondary receiving slot table, wherein a bandwidth indicated by the first secondary receiving slot table is greater than a bandwidth indicated by the first primary receiving slot table; and
    switch from the first primary receiving slot table to the first secondary receiving slot table.

2. The intermediate node according to claim 1, wherein the instructions implemented by the processor further cause the intermediate node to:
    before sending the second indication information to the downstream node, receive first indication information from the downstream node, wherein the first indication information is used to instruct the intermediate node to increase the bandwidth of the transmission channel.

3. The intermediate node according to claim 2, wherein after receiving the first indication information from the downstream node, the instructions implemented by the processor further cause the intermediate node to:
    send fifth indication information and the second secondary sending slot table to the downstream node, wherein the fifth indication information is used to request the downstream node to switch to the second secondary receiving slot table; and
    receive sixth indication information from the downstream node, wherein the sixth indication information indicates that the downstream node allows switching to the second secondary receiving slot table.

4. The intermediate node according to claim 2, wherein the first indication information is carried in a FlexE overhead.

5. The intermediate node according to claim 4, wherein a FlexE overhead used to carry the first indication information comprises an identifier of the transmission channel.

6. The intermediate node according to claim 1, wherein the instructions implemented by the processor further cause the intermediate node to:
    after switching to the second secondary sending slot table, before receiving the fourth indication information, send third indication information to the upstream node, wherein the third indication information is used to instruct the upstream node to increase the bandwidth of the transmission channel.

7. The intermediate node according to claim 6, wherein the instructions implemented by the processor further cause the intermediate node to:
    after sending the third indication information to the upstream node, synchronize the first secondary receiving slot table based on the first secondary sending slot table, so that a receiving slot of the first secondary receiving slot table is consistent with a slot of the first secondary sending slot table.

8. The intermediate node according to claim 7, wherein the instructions implemented by the processor further cause the intermediate node to:
    before synchronizing the first secondary receiving slot table based on the first secondary sending slot table, determine that the slot indicated by the first secondary sending slot table is in an available state.

9. The intermediate node according to claim 7, wherein the instructions implemented by the processor further cause the intermediate node to:
    before synchronizing the first secondary receiving slot table based on the first secondary sending slot table,
    receive seventh indication information and the first secondary sending slot table from the upstream node, wherein the seventh indication information is used to request the intermediate node to switch from the first primary receiving slot table to the first secondary receiving slot table.

10. The intermediate node according to claim 7, wherein the instructions implemented by the processor further cause the intermediate node to:
after synchronizing the first secondary receiving slot table based on the first secondary sending slot table,
send eighth indication information to the upstream node, wherein the eighth indication information is used to indicate that the intermediate node allows switching from the first primary receiving slot table to the first secondary receiving slot table.

11. A system for adjusting a bandwidth of a transmission channel in flexible Ethernet (FlexE), wherein the system comprises an upstream node of an intermediate node, the intermediate node, and a downstream node of the intermediate node on a path of the transmission channel, the intermediate node communicates with the upstream node and the downstream node via FlexE interfaces respectively, the system is configured to:
successively increase the bandwidth of the downstream node, the intermediate node and the upstream node based on a direction reverse to flow direction of a service along the transmission channel.

12. The system according to claim 11, wherein the successively increase the bandwidth of the downstream node, the intermediate node and the upstream node, comprises the following operations:
the downstream node switches from a second primary receiving slot table to a second secondary receiving slot table, wherein a bandwidth indicated by the second secondary receiving slot table is greater than a bandwidth indicated by the second primary receiving slot table;
the intermediate node switches from a second primary sending slot table to a second secondary sending slot table, wherein a bandwidth indicated by the second secondary sending slot table is greater than a bandwidth indicated by the second primary sending slot table;
after the downstream node switching to the second secondary receiving slot table and the intermediate node switching to the second secondary sending slot table, the intermediate node switches from the currently used first primary receiving slot table to a first secondary receiving slot table, and the upstream node switches from a first primary sending slot table to a first secondary sending slot table, wherein a bandwidth indicated by the first secondary receiving slot table is greater than a bandwidth indicated by the first primary receiving slot table, and a bandwidth indicated by the first secondary sending slot table is greater than a bandwidth indicated by the first primary sending slot table.

13. The system according to claim 12, wherein the operations further comprises:
before the downstream node switching to the second secondary receiving slot table, the downstream sends first indication information instructing the intermediate node to increase the bandwidth of the transmission channel.

14. The system according to claim 13, wherein the operations further comprises:
after receiving the first indication information, the intermediate node sends second indication information instructing the downstream node to switch to the second secondary receiving slot table.

15. The system according to claim 14, wherein the operations further comprises:
after switching to the second secondary sending slot table, the intermediate node sends third indication information instructing the upstream node to increase the bandwidth of the transmission channel.

16. The system according to claim 15, wherein the operations further comprises: after receiving the third indication information and before switching to the first secondary sending slot table, the upstream node sends fourth indication information instructing the intermediate node to switch to the first secondary receiving slot table.

17. A system for adjusting a bandwidth of a transmission channel in flexible Ethernet (FlexE), wherein the system comprises an upstream node of an intermediate node, the intermediate node, and a downstream node of the intermediate node on a path of the transmission channel, the intermediate node communicates with the upstream node and the downstream node via FlexE interfaces respectively, the system is configured to:
successively decrease the bandwidth of the upstream node, the intermediate node and the downstream node based on a flow direction of a service along the transmission channel.

18. The system according to claim 17, wherein the successively decrease the bandwidth of the upstream node, the intermediate node and the downstream node, comprises the following operations:
the upstream node switches from a first primary sending slot table to a first secondary sending slot table, wherein a bandwidth indicated by the first secondary sending slot table is less than a bandwidth indicated by the first primary sending slot table;
the intermediate node switches from a first primary receiving slot table to a first secondary receiving slot table, wherein a bandwidth indicated by the first secondary receiving slot table is less than a bandwidth indicated by the first primary receiving slot table;
after the upstream node switching to the first secondary sending slot table and the intermediate node switching to the first secondary receiving slot table, the intermediate node switches from a second primary sending slot table to a second secondary sending slot table, and the downstream node switches from a second primary receiving slot table to a second secondary receiving slot table, wherein a bandwidth indicated by the second secondary sending slot table is less than a bandwidth indicated by the second primary sending slot table, and a bandwidth indicated by the second secondary receiving slot table is less than a bandwidth indicated by the second primary receiving slot table.

19. The system according to claim 18, wherein the operations further comprises:
before switching to the first secondary sending slot table, the upstream node sends to the intermediate node first indication information instructing the intermediate node to switch to the first secondary receiving slot table.

20. The system according to claim 19, wherein the operations further comprises:
after switching to the first secondary receiving slot table, before switching to the second secondary sending slot table, the intermediate node sends to the downstream node third indication information instructing the downstream node to switch to the second secondary receiving slot table.

* * * * *